(12) United States Patent
Bleyer et al.

(10) Patent No.: US 10,557,921 B2
(45) Date of Patent: Feb. 11, 2020

(54) ACTIVE BRIGHTNESS-BASED STRATEGY FOR INVALIDATING PIXELS IN TIME-OF-FLIGHT DEPTH-SENSING

(71) Applicant: Microsoft Technology Licensing, LLC, Redmond, WA (US)

(72) Inventors: Michael Bleyer, Seattle, WA (US); Raymond Kirk Price, Redmond, WA (US); Jian Zhao, Kenmore, WA (US); Denis Claude Pierre Demandolx, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 347 days.

(21) Appl. No.: 15/412,485

(22) Filed: Jan. 23, 2017

(65) Prior Publication Data
US 2018/0210070 A1 Jul. 26, 2018

(51) Int. Cl.
*G01C 3/08* (2006.01)
*G01S 7/48* (2006.01)
*G01S 7/497* (2006.01)

(52) U.S. Cl.
CPC ............ *G01S 7/4808* (2013.01); *G01S 7/497* (2013.01)

(58) Field of Classification Search
CPC ........ G01S 7/4808; G01S 7/497; G01S 17/89; G01S 17/36
USPC ....................................................... 356/5.01
See application file for complete search history.

(56) References Cited

U.S. PATENT DOCUMENTS

| | | | |
|---|---|---|---|
| 7,408,627 B2 | 8/2008 | Bamji et al. |
| 7,511,801 B1 | 3/2009 | Rafii et al. |
| 8,152,198 B2 | 4/2012 | Breed et al. |
| 9,182,492 B2 | 11/2015 | Godbaz et al. |
| 9,213,883 B2 | 12/2015 | Kim et al. |

(Continued)

FOREIGN PATENT DOCUMENTS

EP 2088453 A1 8/2009

OTHER PUBLICATIONS

Kirmani, et al., "Spumic: Simultaneous Phase Unwrapping and Multipath Interference Cancellation in Time-Of-Flight Cameras Using Spectral Methods," in Proceedings of the 2013 IEEE International Conference on Multimedia and Expo, Jul. 2013, 6 pages.

(Continued)

*Primary Examiner* — Mark Hellner

(57) ABSTRACT

A computer-implemented technique is described herein for invalidating pixels in a time-of-flight depth-sensing device based on active brightness (AB) measurements. In one implementation, the technique involves, for each sensing element of a sensor: generating frequency-specific sensor readings in response to receiving instances of radiation having plural frequencies (e.g., frequencies $f_1$, $f_2$, and $f_3$); generating a set of active brightness measurements ($AB_{f1}$, $AB_{f2}$, and $AB_{f3}$) associated with the respective frequencies; generating a variation measure that reflects an extent of variation within the set of active brightness measurements; and invalidating a pixel associated with the particular sensing element if the variation measure satisfies a prescribed invalidation condition.

20 Claims, 12 Drawing Sheets

(56) References Cited

U.S. PATENT DOCUMENTS

| | | | |
|---|---|---|---|
| 9,989,406 B2* | 6/2018 | Pacala | G01S 17/42 |
| 2006/0241371 A1 | 10/2006 | Rafii et al. | |
| 2014/0347443 A1 | 11/2014 | Cohen et al. | |
| 2015/0049347 A1 | 2/2015 | Laffargue et al. | |
| 2015/0253429 A1 | 9/2015 | Dorrington et al. | |
| 2016/0210780 A1 | 7/2016 | Paulovich et al. | |

OTHER PUBLICATIONS

Godbaz, et al., "Closed-form Inverses for the Mixed Pixel/Multipath Interference Problem in AMCW Lidar," in Proceedings of SPIE—IS&T Electronic Imaging, vol. 8296, Jan. 2012, 15 pages.

Lefloch, et al., "Technical Foundation and Calibration Methods for Time-of-Flight Cameras," in Time-of-Flight and Depth Imaging, vol. 8200, Lecture Notes in Computer Science, 2013, 20 pages.

Gupta, et al., "Phasor Imaging: A Generalization of Correlation-Based Time-of-Flight Imaging," available at <<http://matthias.hullin.net/publications/GuptaEtAl-PhasorImaging-TOG2015.pdf>>, corresponding to paper in ACM Transactions on Graphics, vol. 34, No. 5, Oct. 2015, 22 pages.

Bhandari, et al., "Resolving Multi-path Interference in Time-of-Flight Imaging via Modulation Frequency Diversity and Sparse Regularization," available at <<https://airxiv.org/pdf/1404.1116.pdf>>, arXiv:1404.1116 [cs.CV], Apr. 2014, 11 pages.

Son, et al., "Learning to Remove Multipath Distortions in Time-of-Flight Range Images for a Robotic Arm Setup," available at <<https://arxiv.org/pdf/1601.01750v3.pdf>>, arXiv:1601.01750 [cs.CV], Feb. 2016, 8 pages.

Freedman, et al., "SRA: Fast Removal of General Multipath for ToF Sensors," available at <<https://arxiv.org/pdf/1403.5919v1.pdf>>, arXiv:1403.5919 [cs.CV], Mar. 2014, 15 pages.

Lucas, et al., "An Iterative Image Registration Technique with an Application to Stereo Vision," in Proceedings of Imaging Understanding Workshop, 1981, 10 pages.

Horn, et al., "Determining Optical Flow," in Artificial Intelligence, vol. 17, 1981, 19 pages.

"Horn-Schunck method," available at <<https://en.wikipedia.org/wiki/Horn-Schunck_method>>, Wikipedia article, accessed on Jan. 18, 2017, 3 pages.

"Lucas-Kanade method," available at <<https://en.wikipedia.org/wiki/Lucas-Kanade_method>>, Wikipedia article, accessed on Jan. 18, 2017, 4 pages.

Li, Larry "Time-of-Flight Camera—An Introduction," Texas Instruments, Technical White Paper, SLOA190, Jan. 2014, 10 pages.

Hansard, et al., Time of Flight Cameras: Principles, Methods, and Applications, in Springer Briefs in Computer Science, ISBN 978-1-4471-4658-2, 2012, 103 pages.

* cited by examiner

ACTIVE BRIGHTNESS-BASED STRATEGY FOR INVALIDATING PIXELS IN TIME-OF-FLIGHT DEPTH-SENSING

BACKGROUND

A time-of-flight (ToF) depth camera projects infrared radiation onto a scene. It then uses a sensor to detect the infrared radiation that is reflected from the scene, to provide a plurality of sensor readings. A processing component converts the sensor readings into depth values that collectively constitute a depth image. Ideally, each sensor element of the sensor, associated with a pixel, measures the distance between the depth camera and a single point in the scene. The processing component may thereafter leverage the depth image to perform some context-specific task, such as providing a mixed-reality experience, controlling the navigation of a vehicle, producing a three-dimensional reconstruction of the scene, etc.

The depth image may suffer from artifacts due to various factors, such as motion blur and multipath interference. Motion blur occurs when the depth camera and/or objects in the environment quickly move while the depth camera is performing exposure of its sensor. Due to such a phenomenon, the depth camera's sensor may produce conflicting depth-related information regarding a particular point in the environment, e.g., by interpreting the point as part of the foreground at the beginning of a reading and interpreting the point as part of the background at the end of the reading. Multipath interference occurs when the depth camera's sensor receives infrared radiation that represents the contribution of several different radiation paths having different respective travel times and associated depths. The sensor may produce a faulty depth reading due to the contribution of these different paths.

SUMMARY

A computer-implemented technique is described herein for invalidating pixels in a time-of-flight depth-sensing device based on active brightness (AB) measurements. In one implementation, the technique involves, for each sensing element of a sensor: generating frequency-specific sensor readings in response to receiving instances of radiation having plural frequencies (e.g., frequencies $f_1$, $f_2$, and $f_3$); generating a set of active brightness measurements ($AB_{f1}$, $AB_{f2}$, and $AB_{f3}$) associated with the respective frequencies; generating a variation measure that reflects an extent of variation within the set of active brightness measurements; and invalidating a pixel associated with the particular sensing element if the variation measure satisfies a prescribed invalidation condition.

Overall, the technique successfully removes sensor readings corrupted by multipath interference and/or motion blur effects that would otherwise lead to inaccurate depth values, thereby improving the quality of depth images produced by the time-of-flight depth-sensing device. The technique can be used by itself, or in conjunction with one or more other types of pixel invalidation strategies, such as a phase-based pixel invalidation technique.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

Figure 1:
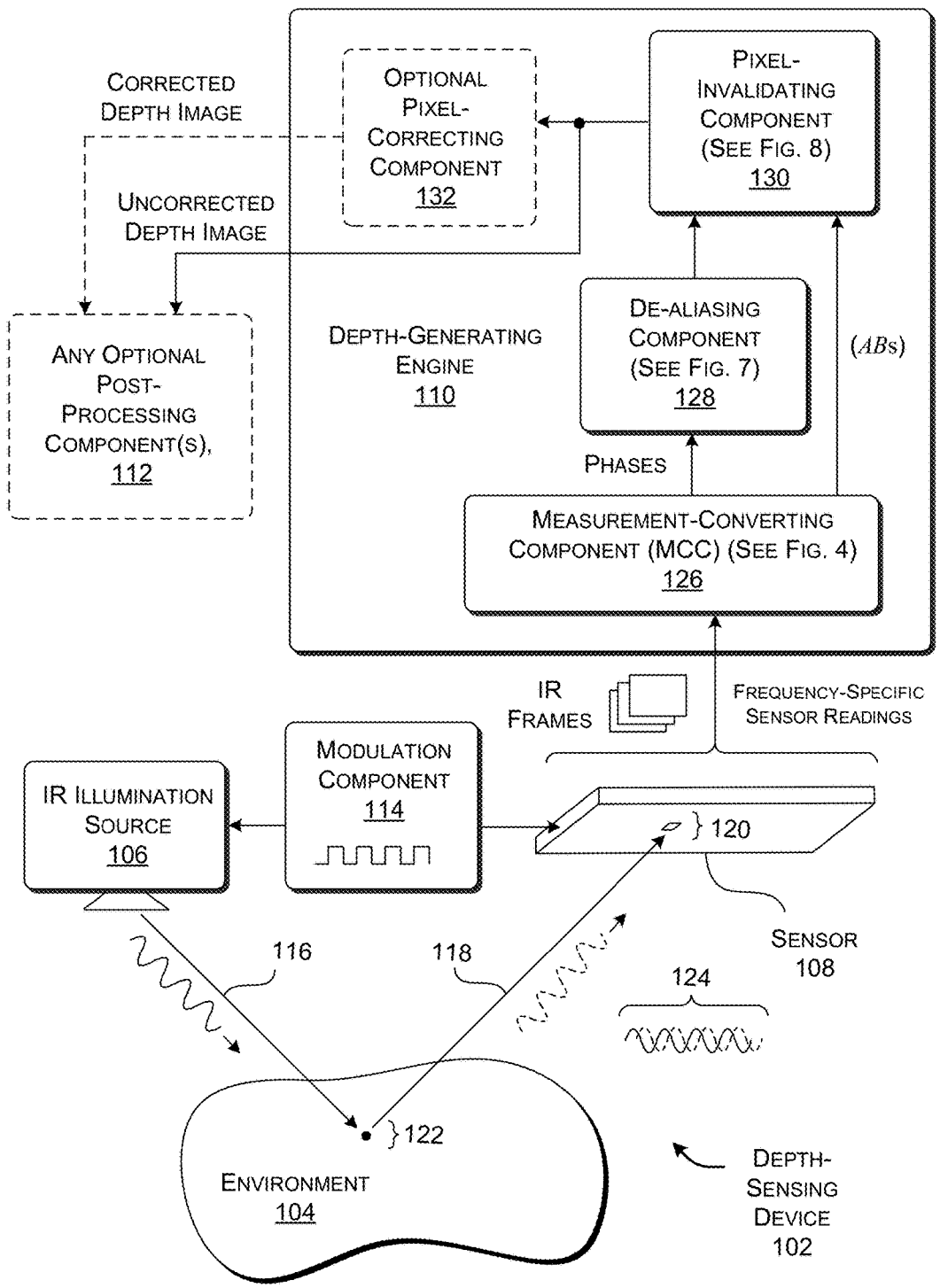
FIG. 1 shows a depth-sensing device for sensing the depths of points in an environment using a phase-based time-of-flight (ToF) technique.

This disclosure is organized as follows. Section A describes a time-of-flight depth-sensing device that invalidates pixels based on active brightness information. Section B sets forth illustrative methods which explain the operation of the depth-sensing device of Section A. And Section C describes illustrative computing functionality that can be used to implement certain processing operations described in Sections A and B.

As a preliminary matter, some of the figures describe concepts in the context of one or more structural components, also referred to as functionality, modules, features, elements, etc. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, some of the blocks shown in the flowcharts can be implemented by software running on computer equipment, or other logic hardware (e.g., FPGAs), etc., or any combination thereof.

As to terminology, the phrase "configured to" encompasses various physical and tangible mechanisms for performing an identified operation. In a computer-processing-related context, the mechanisms can be configured to perform an operation using, for instance, software running on computer equipment, or other logic hardware (e.g., FPGAs), etc., or any combination thereof.

The term "logic" encompasses various physical and tangible mechanisms for performing a processing task. For instance, each data processing operation illustrated in the flowcharts corresponds to a logic component for performing that operation. An operation can be performed using, for instance, software running on computer equipment, or other logic hardware (e.g., FPGAs), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

FIG. 1 shows a depth-sensing device 102 that uses a phase-based time-of-flight (ToF) technique to determine the depths of points in an environment 104. The depth-sensing device 102 can optionally be incorporated into a more encompassing device, such as a head-mounted display. Alternatively, or in addition, the depth-sensing device 102 can work in conjunction with a separate processing system, such as a separate gaming system or an environment-modeling system.

By way of overview, the depth-sensing device 102 includes an illumination source 106 for emitting electromagnetic radiation, such as infrared radiation having wavelengths in the range of 700 nm and 1000 nm. Although not shown, a diffuser element can spread the infrared radiation over the environment 104 in a uniform manner. The infrared radiation impinges the environment 104 and is reflected therefrom. A sensor 108 detects the reflected radiation and generates a plurality of sensor readings in response thereto. Each sensor reading reflects the correlation between an instance of radiation that is transmitted by the illumination source 106 and a corresponding instance of radiation that is reflected from the environment 104 and sensed by the sensor 108.

A depth-generating engine 110 processes the plurality of sensor readings to generate a depth image. The depth image reflects the distance between a reference point and a plurality of points in the environment 104. The reference point generally corresponds to the location of the depth-sensing device 102 that emits and receives the infrared radiation. For instance, when the depth-sensing device 102 is incorporated into a head-mounted display, the reference point corresponds to a reference location associated with the head-mounted display.

One or more post-processing components 112 can further process the depth image in accordance with various use scenarios. For example, in one use scenario, a head-mounted display uses the depth image to determine the relation of a user to different objects in the environment 104, e.g., for the ultimate purpose of generating a mixed-reality experience. In another use scenario, a navigation system uses the depth image to determine the relation of a mobile agent (such as a vehicle, drone, etc.) to the environment 104, for the ultimate purpose of controlling the movement of the mobile agent in the environment. In another use scenario, a modeling system uses the depth image to generate a three-dimensional representation of objects within the environment 104, and so on. These post-processing contexts are cited by way of example, not limitation; the depth-sensing device 102 can be used in other use scenarios.

The illumination source 106 may correspond to a laser or a light-emitting diode, or some other source of electromagnetic radiation in the infrared spectrum and/or some other portion(s) of the spectrum. A modulation component 114 controls the illumination source 106 to produce an amplitude-modulated continuous wave of radiation, e.g., corresponding to a square wave, a sinusoidal wave, or some other periodic signal having a frequency co. FIG. 1 shows a high-level representation of a transmitted signal 116, corresponding to an instance of radiation produced by the illumination source 106 in cooperation with the modulation component 114.

The sensor 108 can be implemented as a Complementary Metal-Oxide-Semiconductor (CMOS) sensor having a plurality of sensing elements. Each sensing element receives an instance of reflected radiation and generates a sensor reading in response thereto. FIG. 1 shows a high-level representation of a received signal 118 received by a particular sensing element 120. The received signal 118 specifically corresponds to an instance of infrared radiation that is reflected primarily from a particular point 122 in the environment 104. The point 122 has a reflectivity (r) associated therewith that expresses how readily the point 122 reflects light.

As noted above, the sensor reading expresses the correlation between the transmitted signal 116 and the received signal 118. The correlation, in turn, expresses the manner in which the received signal 118 has shifted relative to the transmitted signal 116. FIG. 1 represents the correlation between the transmitted signal 116 and the received signal 118 in a high-level manner by showing a superposition 124 of the transmitted signal 116 and the received signal 118. The shift between the two signals (116, 118), in turn, reflects the amount of time Δt between the emission of the transmitted signal 116 and the receipt of the corresponding received signal 118. The depth-sensing device 102 can calculate the depth of the point 122 in the environment based on Δt and the speed of light c.

The sensor 108 includes a global shutter that is driven by the same modulation component 114. The global shutter controls the timing at which each sensing element accumulates charge and subsequently outputs its sensor reading. As will be described more fully below, this configuration allows the depth-sensing device 102 to coordinate the modulation timing of the illumination source 106 with the sensor 108.

More specifically, the depth-sensing device 102 produces a sequence of sensor readings for use in determining the depth of the point 122. For instance, the depth-sensing device 102 can drive the illumination source 106 to sequentially produce transmitted signals having N different frequencies. And for each frequency, the depth-sensing device 102 can drive the sensor 108 such that it detects a received signal at M different phase offsets relative to a corresponding transmitted signal. Hence, the depth-sensing device 102 collects N×M sensor readings for each depth measurement.

For instance, in non-limiting case, the depth-sensing device 102 operates using three (N=3) different frequencies ($f_1$, $f_2$, $f_3$) and three (M=3) different phase offsets ($\theta_1$, $\theta_2$, $\theta_3$). To perform this operation, the depth-sensing device 102 can collect nine sensor readings in the following temporal sequence: ($f_1$, $\theta_1$), ($f_1$, $\theta_2$), ($f_1$, $\theta_3$), ($f_2$, $\theta_1$), ($f_2$, $\theta_2$), ($f_2$, $\theta_3$), ($f_3$, $\theta_1$), ($f_3$, $\theta_2$), and ($f_3$, $\theta_3$). In one implementation, $\theta_1$=0 degrees, $\theta_2$=120 degrees, and $\theta_3$=240 degrees. Generally, the depth-sensing device 102 collects sensor readings at different phase offsets and frequencies to supply enough information to identify a single depth value, given the number of unknowns associated with such a calculation.

The depth-generating engine 110 uses all nine sensor readings produced by the particular sensing element 120 to determine the depth of the point 122. This means that those nine sensor readings contribute to the computation of the depth value of a particular element (e.g., pixel) of the depth image produced by the depth-generating engine 110. Altogether, the sensor 108 produces nine frames of sensor readings. A single frame collectively represents all of the sensor readings for a particular combination of frequency and phase offset. By way of terminology, because each sensor reading pertains to a particular frequency, it is referred to on occasion as a "frequency-specific sensor reading."

Figure 4:
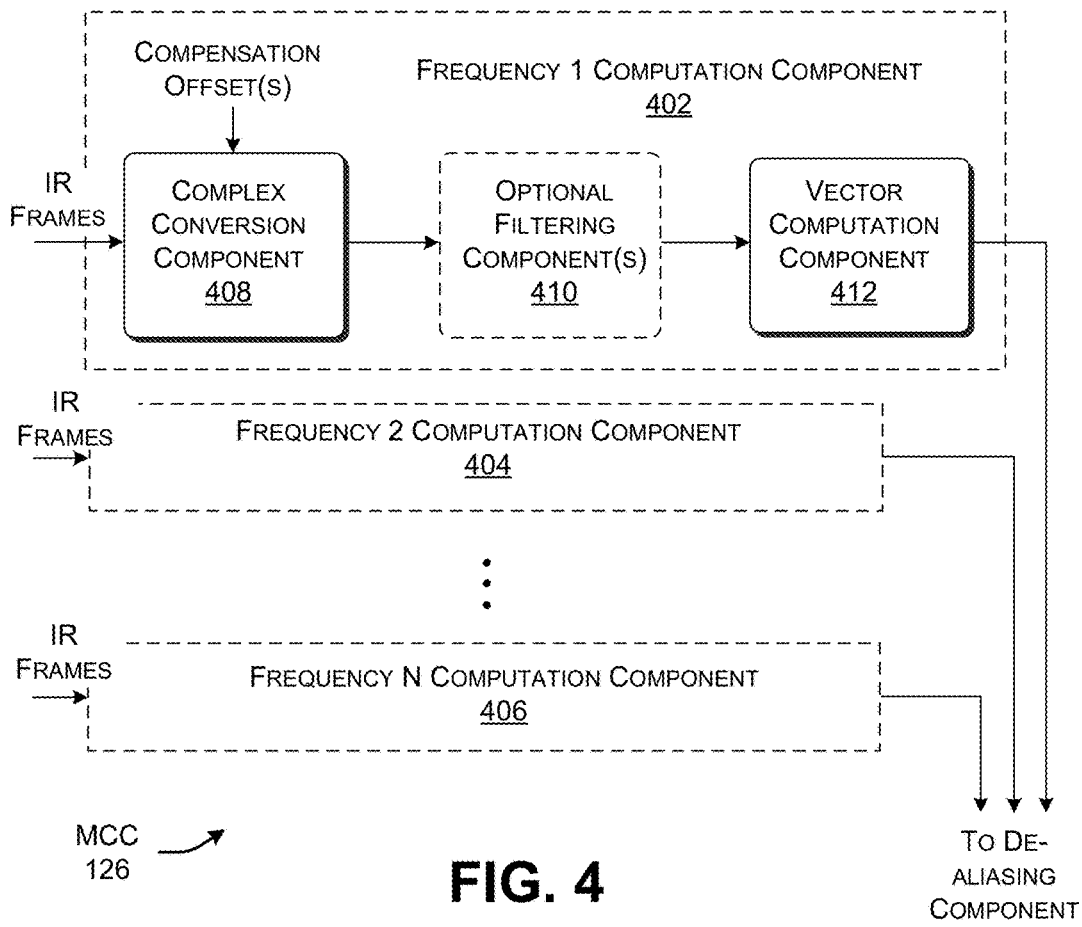
FIG. 4 shows one implementation of a measurement-converting component, which is an element of the depth-sensing device of FIG. 1.

Now referring to the depth-generating engine 110, a measurement-converting component (MCC) 126 converts the plurality of frequency-specific sensor readings to a particular form. For example, consider the operation of the MCC 126 with respect to the processing of nine sensor readings produced by the sensing element 120. The MCC 126 can represent the three sensor readings for each frequency as a single vector in the complex domain having real and imaginary axes. The angle of the vector with respect to the real axis (in the counterclockwise direction) corresponds to phase ($\varphi$), and the magnitude of the vector corresponds to active brightness (AB). The phase generally corresponds to the distance between a reference point and the point 122 in the scene. The active brightness generally corresponds to the intensity of radiation detected by the sensing element 120. FIG. 4, to be described below, provides additional details regarding one implementation of the MCC 126.

Altogether, the MCC 126 produces a set of phase measurements and a set of active brightness measurements for each sensor element. That is, in the example in which the depth-sensing device 102 uses three frequencies, the MCC 126 produces three candidate phase measurements ($\varphi_{f1}$, $\varphi_{f2}$, $\varphi_{f3}$) and three active brightness measurements ($AB_{f1}$, $AB_{f2}$, $AB_{f3}$) for each sensor element. With respect to the sensor 108 as a whole, the MCC 126 produces three active brightness images, each of which includes a plurality of AB measurements associated with different sensor elements (and corresponding pixels), with respect to a particular frequency. Similarly, the MCC 126 also produces three phrase images, each of which includes a plurality of phase measurements associated with different sensor elements, with respect to a particular frequency.

Figure 7:
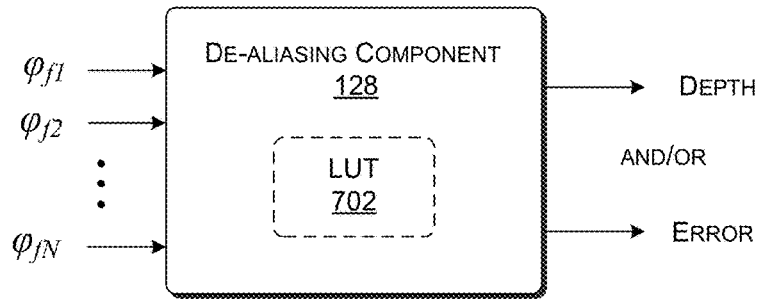
FIG. 7 shows one implementation of the de-aliasing component.

A de-aliasing component 128 processes the set of phase measurements for a sensing element to determine a single distance value. In one implementation, the de-aliasing component 128 performs this task using a lookup table to map the three phase measurements into a distance value. In some situations, however, the set of phase measurements reflect corrupted information. Here, the de-aliasing component 128 may produce an output result that indicates that there is no viable distance value corresponding to the set of phase measurements. FIG. 7, to be described below, provides additional details regarding one implementation of the de-aliasing component 128. The use of the de-aliasing component 128 to identify inaccurate pixels is referred to below as a phase-based invalidation strategy.

A pixel-invalidating component 130 determines, for each sensing element, whether a corresponding pixel should be invalidated. In one implementation, the pixel-invalidating component 130 performs this task by determining an extent of variation in the N (e.g., three) active brightness measurements. The pixel-invalidating component 130 determines whether this extent of variation satisfies a predetermined invalidation criterion. If so, the pixel-invalidating component 130 will invalidate the pixel. By invalidating the pixel, the depth-generating engine 110 ensures that a faulty depth value (generated by the de-aliasing component 128) will not appear in the resultant depth image.

Figure 8:
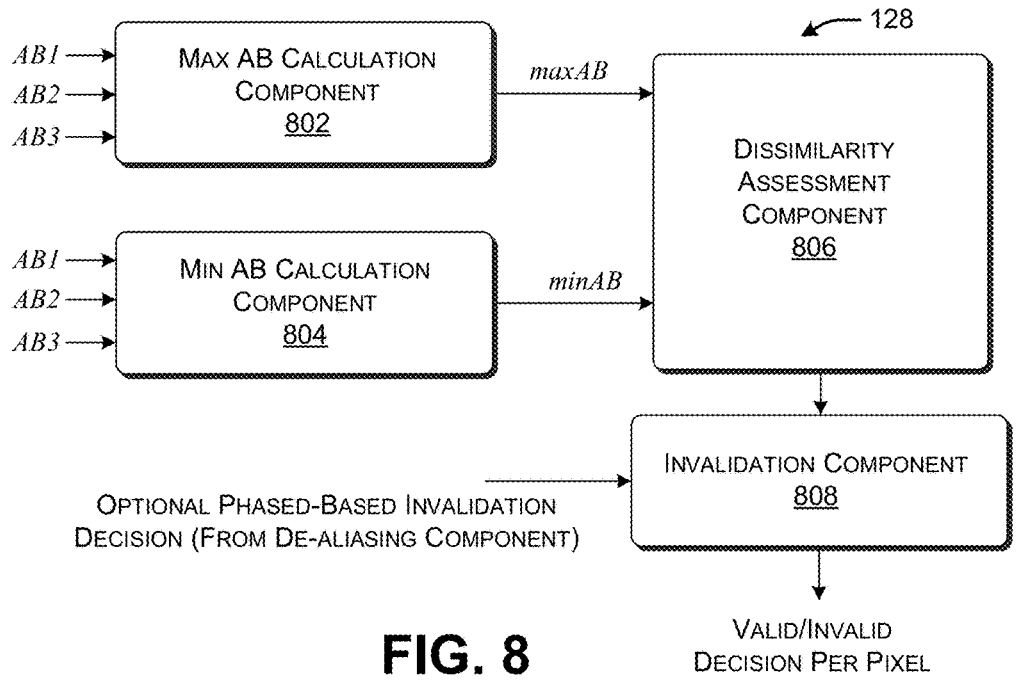
FIG. 8 shows one implementation of a pixel-invalidating component, which is another element of the depth-sensing device of FIG. 1.

In another implementation, the pixel-invalidating component 130 also makes its decision (whether to invalidate a pixel) based on the phase-based information produced by the de-aliasing component 128. For example, the de-aliasing component 128 may process the three phase measurements to produce an independent assessment that the collected sensor readings do not map to a viable depth value. The pixel-invalidating component 130 can decide to invalidate a pixel if either the phase-based information or the active-brightness-based information indicates that the pixel is inaccurate. FIG. 8, to be described below, provides additional details regarding one implementation of the pixel-invalidating component 130.

One or more underlying factors may contribute to the collection of inaccurate sensor readings, which leads to the invalidation of a pixel. Such factors can include, but are not limited to, motion blur and multipath interference. Motion blur occurs when there is rapid movement of the depth-sensing device 102 and/or there is rapid movement of objects in the environment 104 being imaged by the depth-sensing device 102. Multipath interference occurs when a sensing element receives instances of radiation associated with different paths having different respective depths associated therewith. Hence, by invalidating pixels, the depth-generating engine 110 can reduce the effects of both motion blur and multipath interference. Additional details regarding the causes of inaccurate sensor readings appear below.

An optional pixel-correcting component 132 can reconstruct/repair a pixel that has been invalidated. In one approach, the pixel-correcting component 132 can use an optical flow technique to determine the optical flow with respect to the original sensor readings produced by the sensor 108, and/or the measurements produced by the MCC 126, and/or the depth values produced by the depth-generating engine 110. The pixel-correcting component 132 can then leverage the optical flow information to supply missing pixels that have been invalidated by the pixel-invalidating component 130. Alternatively, or in addition, the pixel-correcting component 132 can use various methods of pixel interpolation to fill in missing depth data. These methods include, but are not limited to, simple averaging, bilinear interpolation, spline interpolation, and bilateral filtering. Additional information regarding the pixel-correcting component 132 appears below in the context of the explanation of FIG. 13.

Note that FIG. 1 shows an implementation in which certain operations are allocated to the sensor 108 and other operations are allocated to the depth-generating engine 110. Other implementations of the depth-sensing device 102 can allocate operations in a different manner than described above. For example, in another implementation, one or more operations performed by the MCC 126 can be performed by the sensor 108, rather than, or in addition to, the depth-generating engine 110. For instance, one or more operations performed by the MCC 126 can be integrated into an application-specific integrated circuit that implements the sensor 108.

Figure 2:
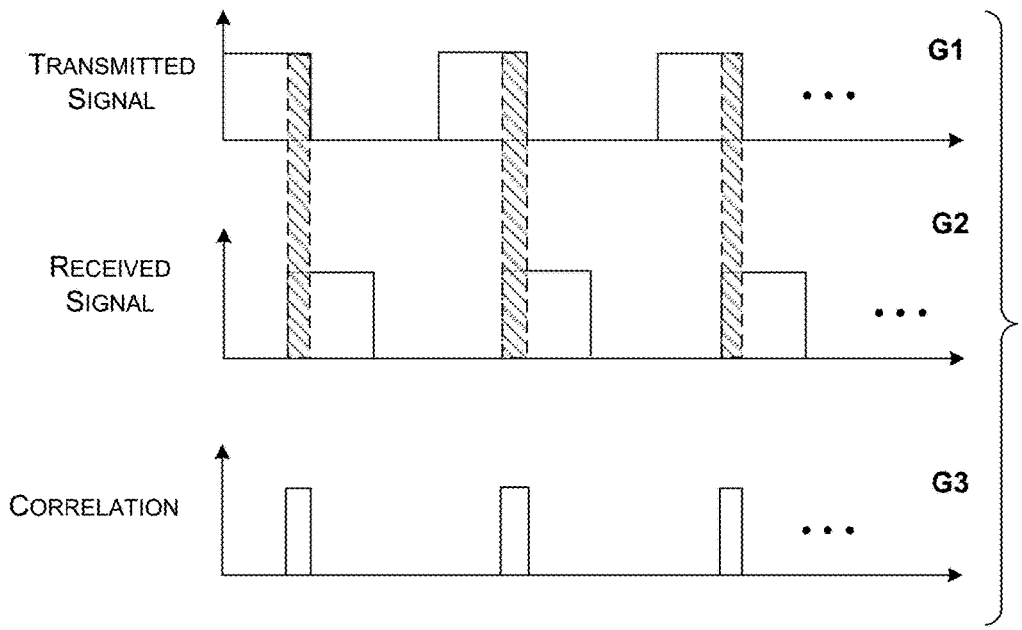
FIG. 2 shows a collection of graphs that demonstrate the manner in which the depth-sensing device of FIG. 1 determines the correlation between a transmitted signal (provided by an illumination source) and a received signal (detected by a sensing element of a sensor).

FIG. 2 shows a relationship between the transmitted signal 116 (shown in graph G1), the received signal 118 (shown in graph G2), and a correlation between the transmitted signal 116 and the received signal 118 (shown in graph G3). Mathematically expressed, the illumination source 106 produces an amplitude-modulated signal having the following form: $s(t)=\cos(\omega t)$, where $\omega$ refers to the modulation frequency and t refers to time. The received signal assumes the form: $r(t)=b+a\cos(\omega t+\varphi)$, where b refers to a constant bias, e.g., due to the presence of ambient light. The symbol $\varphi$ refers to a phase shift, corresponding to the extent to which the phase of the transmitted signal 116 is shifted relative to the received signal 118. The symbol a refers to the amplitude of the received signal. The amplitude varies inversely with respect to the square of the distance from the illumination source 106.

The correlation $c(\theta)$ between the transmitted signal and the received signal can be expressed as:

$$c(\theta)=s \otimes r = \int_{-\infty}^{+\infty} r(t) \cdot s(t+\theta) dt \qquad (1).$$

In this equation, $\theta$ refers to a phase offset. In the example described above in which there are three phase offsets, $\theta$ assumes values of 0 degrees, 120 degrees and 240 degrees. More generally, note that the correlation can be performed by correlating the received signal r(t) with any signal g(t) of the same frequency as the illumination source 106. Equation (1) reduces to the following equation:

$$c(\theta) \sim a \cos(\varphi+\theta) \qquad (2).$$

Figure 3:
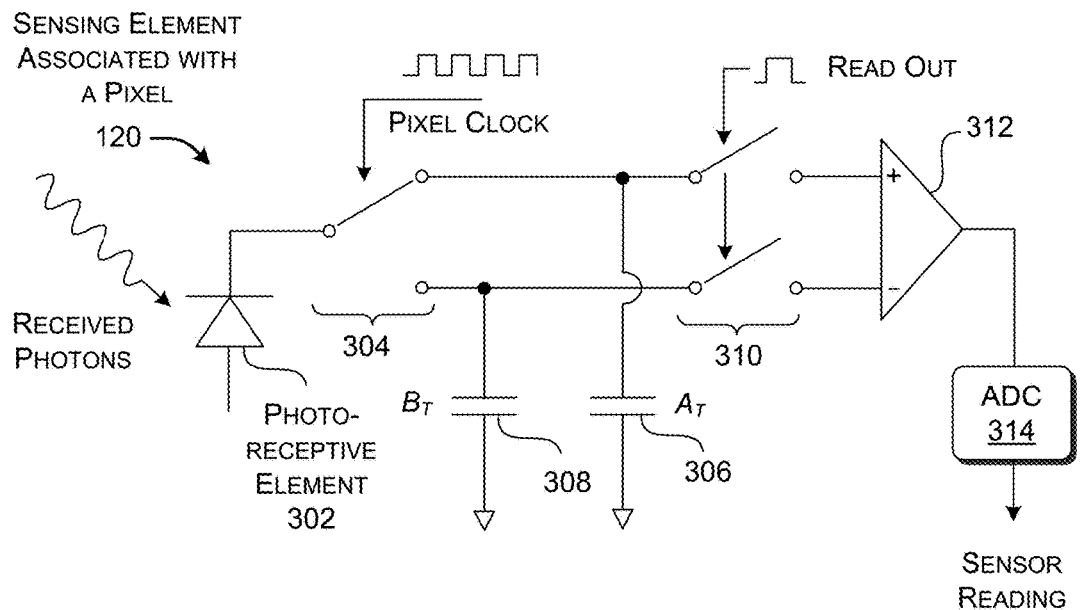
FIG. 3 shows one implementation of a sensing element associated with a differential pixel. A sensor used by the depth-sensing device of FIG. 1 includes a plurality of such sensing elements.

FIG. 3 shows one implementation of the representative sensing element 120 introduced in FIG. 1. Although not shown, the sensor 108 can include an array of the sensing elements of the type shown in FIG. 3. Each sensing element provides sensor readings which contribute to a pixel in the depth image.

The sensing element 120 includes a silicon-implemented photoreceptive element 302 that is responsive to the receipt of infrared radiation that impinges the surface of the sensor 108. The modulation component 114 (of FIG. 1) drives a gate 304. When the modulation signal is in a first state (e.g., a high state), a first node 306 accumulates charge in response to the photons received by the photoreceptive element 302. When the modulation signal is in a second state (e.g., a low state), a second node 308 accumulates charge in response to the photons received by the photoreceptive element 302.

The sensing element 120 provides a first output signal ($A_T$) that reflects the amount of charge accumulated by the first node 306 when a read-out gate 310 is driven to a first state. The sensing element 120 provides a second output signal ($B_T$) that reflects the amount of charge accumulated by the second node 308 when the read-out gate 310 is driven to a second state. An amplifier 312 amplifies the output signals, and an analog-to-digital converter (ADC) 314 transform the analog output signals to corresponding digital output signals. The sensing element 120 produces a sensor reading that expresses the correlation (described in Equation (2)) by subtracting the second output signal from the first output signal. That is, $c(\theta) \sim (A_T - B_T)$, where the subtraction is performed to remove the effects of ambient light.

FIG. 4 shows one implementation of the measurement-converting component (MCC) 126 of FIG. 1. The MCC 126 includes N frequency computation components for processing sensor readings associated with N respective frequencies. For instance, when N=3, a first frequency computation component 402 processes sensor readings associated with a first frequency $f_1$, a second frequency computation component 404 processes sensor readings associated with a second frequency $f_2$, and a third frequency computation component 406 processes sensor readings associated with a third frequency $f_3$. The following explanation describes the operation of the representative first frequency computation component 402 with respect to sensor readings produced by a single sensor element; other frequency computation components have the same subcomponents and exhibit the same manner of operation as the first frequency computation component 402.

A complex conversion component 408 converts a set of sensor readings for the first frequency ($f_1$) into a vector within a complex domain having real (R) and imaginary (I) axes. In one implementation, the complex conversion component 408 can determine the real and imaginary components associated with a related collection of sensor readings using the following two equations:

$$R = \sum_{i=0}^{M} S_i \cos\left(\frac{2\pi}{M}\right), \text{ and} \qquad (3)$$

$$I = \sum_{i=0}^{M} S_i \sin\left(\frac{2\pi}{M}\right). \qquad (4)$$

In these equations, M refers to the number of sensor readings that are taken by the sensing element at different respective phase offsets, for a particular frequency. In the above non-limiting example, M=3. $S_i$ refers to a sensor reading taken at a particular phase offset.

The complex conversion component 408 can also adjust the values produced by Equations (3) and (4) to compensate for various environmental factors. More specifically, the complex conversion component 408 can perform its correction(s) to the values generated by the Equations (3) and (4) and/or the raw sensor readings ($S_i$) fed into the Equations (3) and (4) as inputs.

For example, the MCC 126 may provide a lookup table that provides a plurality of timing parameters associated with the respective sensing elements. Each timing parameter describes the delay (if any) with which a particular sensing element responds to the global shutter signal. The complex conversion component 408 can consult the lookup table to determine a delay associated with a sensing element under consideration; it can then use that delay to adjust the sensor readings associated with that sensing element. In addition, the complex conversion component 408 can perform a correction that is based on the current temperature of the sensor 108, e.g., by using a temperature-correction function and/or a temperature lookup table to identify a correction to be applied to the sensor readings, given the current temperature of the sensor 108.

One or more optional filtering components 410 can perform additional processing on the real and imaginary values produced by the complex conversion component 408. For example, a noise-reducing filter can use a bilateral filtering technique to smooth the real and imaginary values, while preserving edge information expressed by the real and imaginary values. The bilateral filtering technique operates by replacing a value in a frame by a weighted average of neighboring values. The technique can use a Gaussian distribution to compute the weighted average.

A vector calculation component 412 determines a phase measurement ($\varphi$) and an active brightness (AB) for each real and imaginary value computed by the complex conversion component 408 for the particular sensor element under consideration. Generally, the phase measurement reflects the angular relation of a vector in the complex domain with respect to the real axis, in the counterclockwise direction. The active brightness measurement reflects the magnitude of the vector. In one implementation, the following equations can be used to compute the phase measurement and the active brightness measurement:

$$\varphi = \tan^{-1}(I/R) \qquad (5), \text{ and}$$

$$AB = \sqrt{R^2 + I^2} \qquad (6).$$

Figure 5:
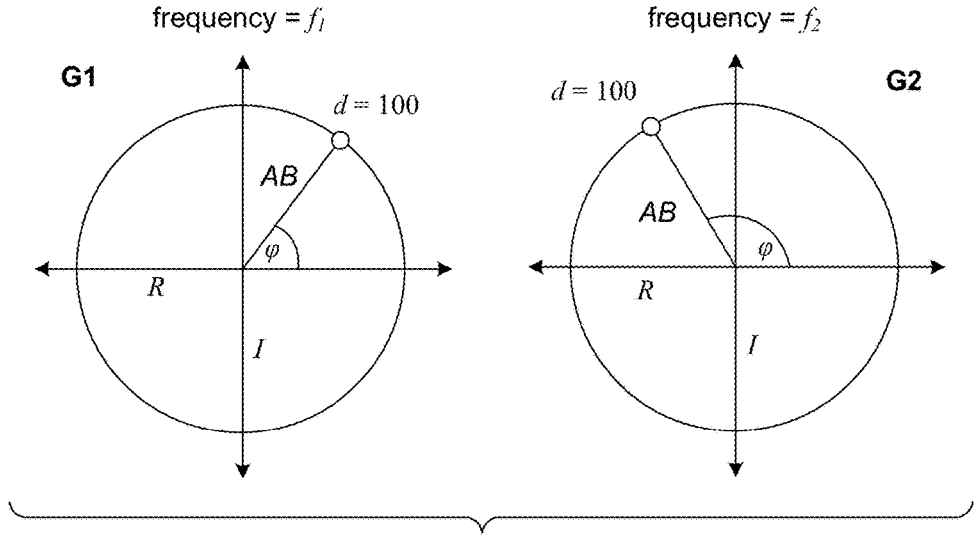
FIG. 5 shows one manner in which sensor readings produced by a sensing element can be represented in the complex domain, with respect to a received signal having a first frequency and a received signal having a second frequency.

FIG. 5 shows a vector generated by the first frequency computation component 402 (for a first frequency $f_1$) and a vector generated by the second frequency computation component 404 (for a second frequency $f_2$). First, note that the first frequency computation component 402 and the second frequency computation component 404 generate different phase measurements that ultimately map to the same distance (e.g., d=100). The frequency computation components (402, 404) produce different phase measurements because phase depends on frequency, and the frequency computation components (402, 404) process signals having different respective frequencies.

Second, note that, on many occasions, the first frequency computation component 402 and the second frequency computation component 404 will produce respective active brightness values that are approximately equal, which is a normal outcome under error-free circumstances. But due to various factors (such as motion blur and multipath interference), the frequency computation components (402, 404) can alternatively produce active brightness measurements that vary with respect to each other to any extent. As will also be described below, the pixel-invalidating component 130 leverages the differences among active brightness measurements to determine whether to invalidate a pixel.

Third, note that any individual phase measurement can potentially map to plural candidate distance measurements. For example, a phase measurement of 70 degrees can refer to 70 degrees or any multiple of 360+70 degrees, corresponding to one or more revolutions of the vector around the origin of the complex domain. Each revolution is commonly referred to as a "wrap." In other words, the measured phase corresponds to $\varphi$, but the actual phase may correspond to any angle defined by $\hat{\varphi}=2\pi n+\varphi$, where n refers to the number of wraps around the origin of the complex domain. For any particular depth measurement, different frequencies may produce phase measurements associated with different wrap integers, e.g., $n_{f1}$, $n_{f2}$, and $n_{f3}$.

Figure 6:
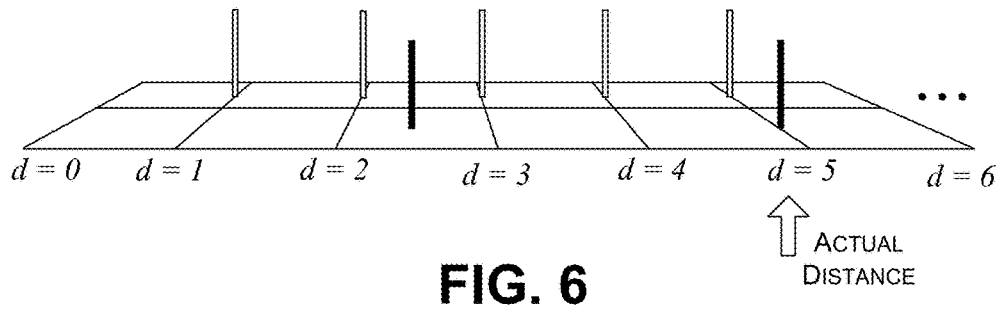
FIG. 6 demonstrates one manner in which a de-aliasing component (of the depth-sensing device of FIG. 1) can use signals having at least two frequencies to resolve ambiguity in depth values associated with any individual signal.

The depth-sensing device 102 produces sensor readings for different frequencies for the principal purpose of resolving the ambiguity associated with any individual phase measurement. For example, as shown in FIG. 6, assume that the first frequency computation component 402 indicates that there are at least five candidate depth values (e.g., at depths 1.0, 2.0, 3.0, 4.0, and 5.0), while the second frequency computation component 404 indicates that there are at least two candidate depth values (e.g., at depths 2.5 and 5.0). The de-aliasing component 128 can therefore choose the depth value at which the two frequency computation components (402, 404) agree, here being d=5. This task logically involves intersecting the candidate depths associated with different frequencies.

FIG. 7 shows one implementation of the de-aliasing component 128. In one implementation, the de-aliasing component receives the three phase measurements that have been computed by the MCC 126 for the three respective frequencies ($f_1$, $f_2$, and $f_3$), with respect to a particular sensor element. It then maps these three phase measurements to a distance associated with the three phase measurements. In one implementation, the de-aliasing component 128 can perform this task by using a predetermined lookup table 702.

The lookup table 702 maps a combination of phases to a single distance associated with those phases. Or the lookup table 702 maps a combination of phases to intermediary information (such as a combination of wrap integers), from which the de-aliasing component 128 can then calculate a single distance. Alternatively, or in addition, the de-aliasing component 128 can use a statistical technique (such as a Maximum Likelihood Estimation technique) or a machine-learned statistical model to map a combination of phases to a single distance.

In other cases, the de-aliasing component 128 maps the phase measurements to an output conclusion that indicates that the combination of phase measurements does not correspond to any viable distance. This conclusion, in turn, indicates that, due to one or more factors, the underlying sensor readings that contribute to the phase measurements are corrupted.

FIG. 8 shows one implementation of the pixel-invalidating component 130. As described above, the pixel-invalidating component 130 invalidates a pixel (and the accompanying sensor readings) associated with a particular sensing element when it is determined that the sensor readings satisfy at least one pixel invalidation condition. In one implementation, the pixel-invalidating component 130 receives the N frequency-specific active brightness (AB) values that have been computed by the MCC 126. A max AB calculation component 802 identifies the maximum AB value in the set of AB values, while a min AB calculation component 804 identifies the minimum AB value in the set of AB values. A dissimilarity assessment component 806 generates a variance measure that reflects an extent of variation in the set of AB values. For example, the dissimilarity assessment component 806 generates a normalized variance measure (Variance) as follows:

$$\text{Variance} = \frac{\text{max}AB - \text{min}AB}{\text{max}AB}. \quad (7)$$

In one implementation, an invalidation component 808 invalidates a pixel if the variance measure Variance exceeds a prescribed environment-specific threshold. In another implementation, the invalidation component 808 also invalidates the pixel if the de-aliasing component 128 indicates that the combination of phases fails to map to a viable distance. Hence, the invalidation component 808 can invalidate a pixel based on either an active-brightness strategy (shown in FIG. 8) or a phase-based strategy.

In yet another implementation, the invalidation component 808 can invalidate a pixel based on a weighted combination of multiple factors, including an active brightness-based invalidation score and a phase-based invalidation score.

The pixel-invalidating component 130 may invalidate a pixel due to one more underlying phenomena that cause distortion in sensor readings. The phenomena include at least multipath interference and motion blur.

Figure 9:
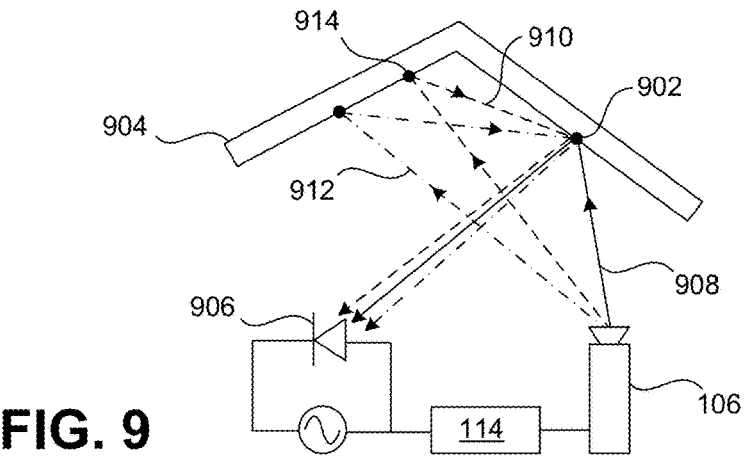
FIG. 9 shows an example that demonstrates the cause of multipath interference.

FIG. 9 shows an example that demonstrates the case of multipath interference. Here, the illumination source 106 emits an instance of infrared radiation that directly travels to a point 902 on an object 904 in the environment 104. A sensing element 906 then receives an instance of radiation that is reflected by the point 902. Because that instance of radiation follows a direct route between the depth-sensing device 102 and the point 902, it accurately correlates with the distance between the depth-sensing device 102 and the point 902.

However, assume that that the sensing element 906 also receives a second instance of radiation that travels along an indirect path 910 to the sensing element 906. Further assume that the sensing element 906 receives a third instance of radiation that travels along another indirect path 912 to the sensing element 906. For example, with respect to the indirect path 910, the radiation bounces off points 914 and 902 (in that order) prior to reaching the sensing element 906. Overall, the sensing element 906 receives instances of radiation reflected from the same point 902, but those instances travel along different paths having different respective distances associated therewith. The contribution of multiple paths, in turn, can lead to ambiguity in the sensor readings collected by the sensing element 906, and may ultimately lead to the generation of an incorrect depth value.

Figure 10:
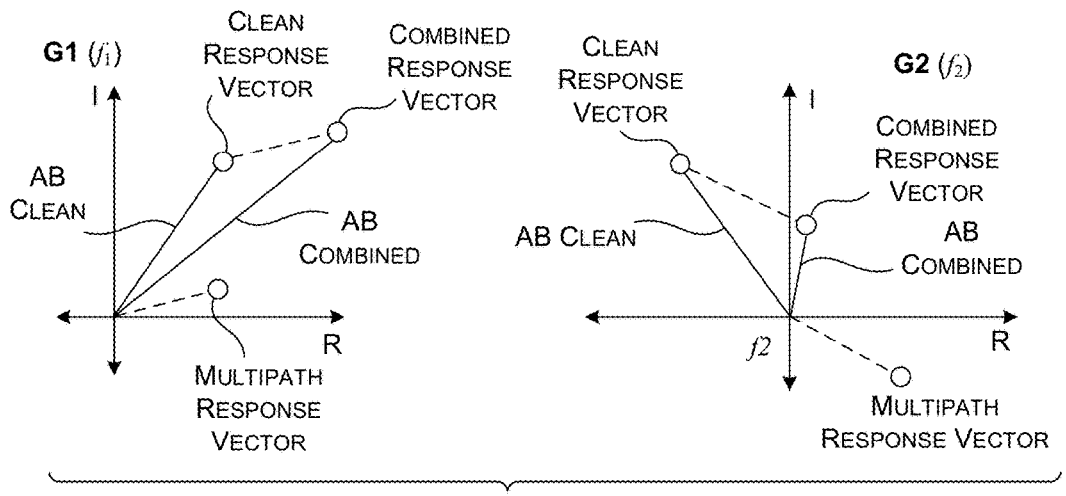
FIG. 10 provides graphs that demonstrate why the pixel-invalidating component (of FIG. 8) is capable of detecting multipath interference.

FIG. 10 provides graphs that demonstrate why the pixel-invalidating component 130 (of FIG. 8) is capable of detecting and removing the effects of multipath interference. In graph G1, assume that the depth-generating engine 110 produces a "combined response" vector that reflects the contribution of infrared radiation received over two different paths having different respective distances ($d_1$ and $d_2$). Further assume that the depth $d_1$ represents the correct distance of the point being imaged, and the depth $d_2$ reflects an instance of radiation received over an incorrect path (e.g., corresponding to the indirect paths 910 or 912 shown in FIG. 9). Finally, assume that the depth-sensing device 102 generates the combined response vector for at least two different frequencies, $f_1$ and $f_2$. That is, the graph G1 shows the combined response vector for the frequency $f_1$, while the graph G2 shows the combined response vector for the frequency $f_2$.

For explanation purposes, each graph also shows the components on which the combined response vector is composed, including a clean response vector and a multipath response vector (although this information is typically not directly measurable by the depth-sensing device 102). The clean response vector represents the vector that would be measured without the effects of multipath interference. The multipath response vector represents the isolated contribution of the inaccurate path, e.g., corresponding to path 910 or path 912 shown in FIG. 9.

In graph G1, note that multipath response vector combines with the clean response vector to produce a combined response vector having a greater AB value compared to the AB value of the clean response vector. But in graph G2, note that the multipath response vector combines with the clean response vector to produce a combined response vector having a smaller AB value compared to the AB value of the clean response vector. This disparity between the AB value of the combined response vector in graph G1 (for frequency $f_1$) and the combined response vector in G2 (for frequency $f_2$) suggests that multipath interference has occurred. The pixel-invalidating component 130 can detect this disparity and remove the corresponding pixel, to thereby remove the effects of multipath interface from the resultant depth image, at least with respect to this individual depth measurement.

Figure 11:
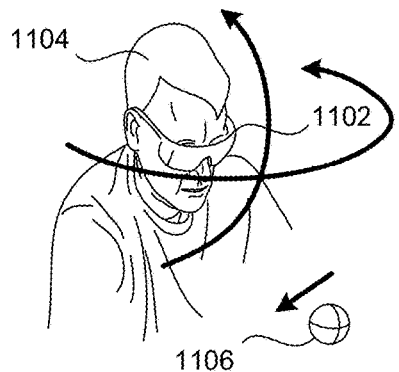
FIG. 11 shows an example that demonstrates the cause of motion blur.

FIG. 11 shows an example that demonstrates the case of motion blur. Here, assume that the depth-sensing device 102 is incorporated into a head-mounted display 1102. Further assume that a user 1104 who wears the head-mounted display 1102 moves his head relatively quickly. Alternatively, or in addition, assume that some object 1106 in the environment 104 moves relatively quickly. In either case, the quick movement can lead to discrepancies in the sensor readings captured by the depth-sensing device 102, associated with the motion blur. Different technical environments may be subject to motion blur to differing extents, e.g., depending on the exposure time and angular resolution of the depth-sensing devices used in these environments to process sensor readings, and the velocity of the object 1106 and its distance to the depth-sensing devices; hence, what constitutes "relatively quickly" for one depth-sensing device and capture scenario may differ from what constitutes "relatively quickly" for another depth-sensing device and capture scenario.

Figure 12:
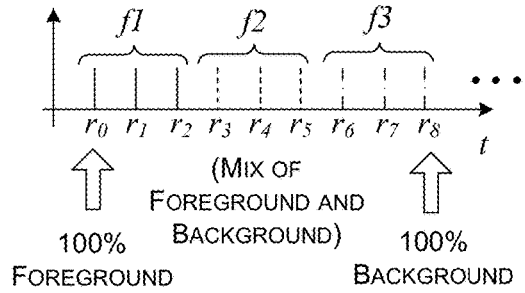
FIG. 12 shows an example that clarifies why motion blur can produce conflicting sensor readings.

FIG. 12 provides additional details that explain the case of a motion blur artifact. Recall that, in one non-limiting case, a single depth measurement encompasses plural (e.g., nine) sensor readings that may be captured in sequence. For instance, the depth-sensing device 102 can capture three sensor readings for frequency $f_1$ at three consecutive phases, three sensor readings for frequency $f_2$ at three consecutive phases, and three sensor readings for frequency $f_3$ at three consecutive phases. (Other implementations can adopt different values of N (the number of frequencies) and M (the number of phase offsets)). Assume that, in the first measurement, the depth-sensing device 102 produces a sensor reading that indicates that a point under consideration is located on a foreground plane at a distance $d_f$. Assume that, in the last measurement, the depth-sensing device 102 produces a sensor reading that indicates that the point under consideration is located in a background plane at a distance $d_b$. Finally assume that, for intermediary measurements, the depth-sensing device 102 can produce sensor readings that indicate that the point under consideration lies both on the foreground plane and the background pane, to varying degrees. The following model simulates these possible results for the case of continuous linear motion:

$$M[i] = R(d_f, r_f)[i] \cdot \left(1 - \frac{i}{8}\right) + R(d_b, r_b)[i] \cdot \frac{i}{8}. \tag{8}$$

Here, M[i] reflects a mixed response for a sensor reading having a channel index i, where i varies from 0 to 8. The symbols $d_f$ and $r_f$ refer to a distance to a point on the foreground plane, and the reflectivity of that point, respectively. The symbols $d_b$ and $r_b$ refer to a distance to a point on the background plane, and the reflectivity of that point, respectively. $R(d_f, r_f)[i]$ and $R(d_b, r_b)[i]$ denote IR sensor readings for channel i at the foreground depth and the background depth, respectively. Note that the measurement M[i] represents a mix of the contribution of the foreground plane and the background plane, depending on the value of i.

A pixel that is interpreted as part of the foreground plane will, in general, have a different active brightness value compared to a pixel that is interpreted as part of the background plane. Hence, the pixel-invalidating component 130 can successfully detect motion blur when there is large variation among the AB values captured at different frequencies, and subsequently invalidate the corresponding pixel.

Note that the depth-sensing device 102 described above has been explained in the context of the removal of inaccurate pixels caused by multipath interference and/or motion blur. But the depth-sensing device 102 is agnostic in nature, and can remove inaccurate pixels caused by other sources of distortion. For instance, the depth-sensing device 102 can remove inaccurate pixels that suffer from a relatively large amount of photon noise.

Referring back momentarily to FIG. 1, in one implementation, the depth-generating engine 110 can send a depth image having invalidated pixels to the post-processing component(s) 112, without correcting these invalidated pixels. The invalidated pixels are manifested in the depth image as missing pixels. In another case, the pixel-correcting component 132 (of FIG. 1) can correct the invalidated pixels to produce a corrected depth image, particularly with respect to case in which the pixels have been invalidated due to the presence of motion blur.

The pixel-correcting component 132 can use different techniques to correct any pixel that has been invalidated. In one approach, the pixel-correcting component 132 can use any optical flow technique (such as the Lucas-Kanade method or the Horn and Schunk method, etc.) to generate optical flow information for a sequence of measurements produced by the MCC 126, for the respective pixels that will compose a depth image. The optical flow information reveals the manner in which the pixels move across a succession of frames captured at successive times. The pixel-correcting component 132 can then leverage the optical flow information to fill in a missing pixel. Background information regarding the general topic of optical flow can be found, for instance, in LUCAS, et al., "An Iterative Image Registration Technique with an Application to Stereo Vision," in Proceedings of Imaging Understanding Workshop, 1981, pages 121-130, and HORN, et al., "Determining Optical Flow," in Artificial Intelligence, Vol. 17, 1981, pages 185-203.

Figure 13:
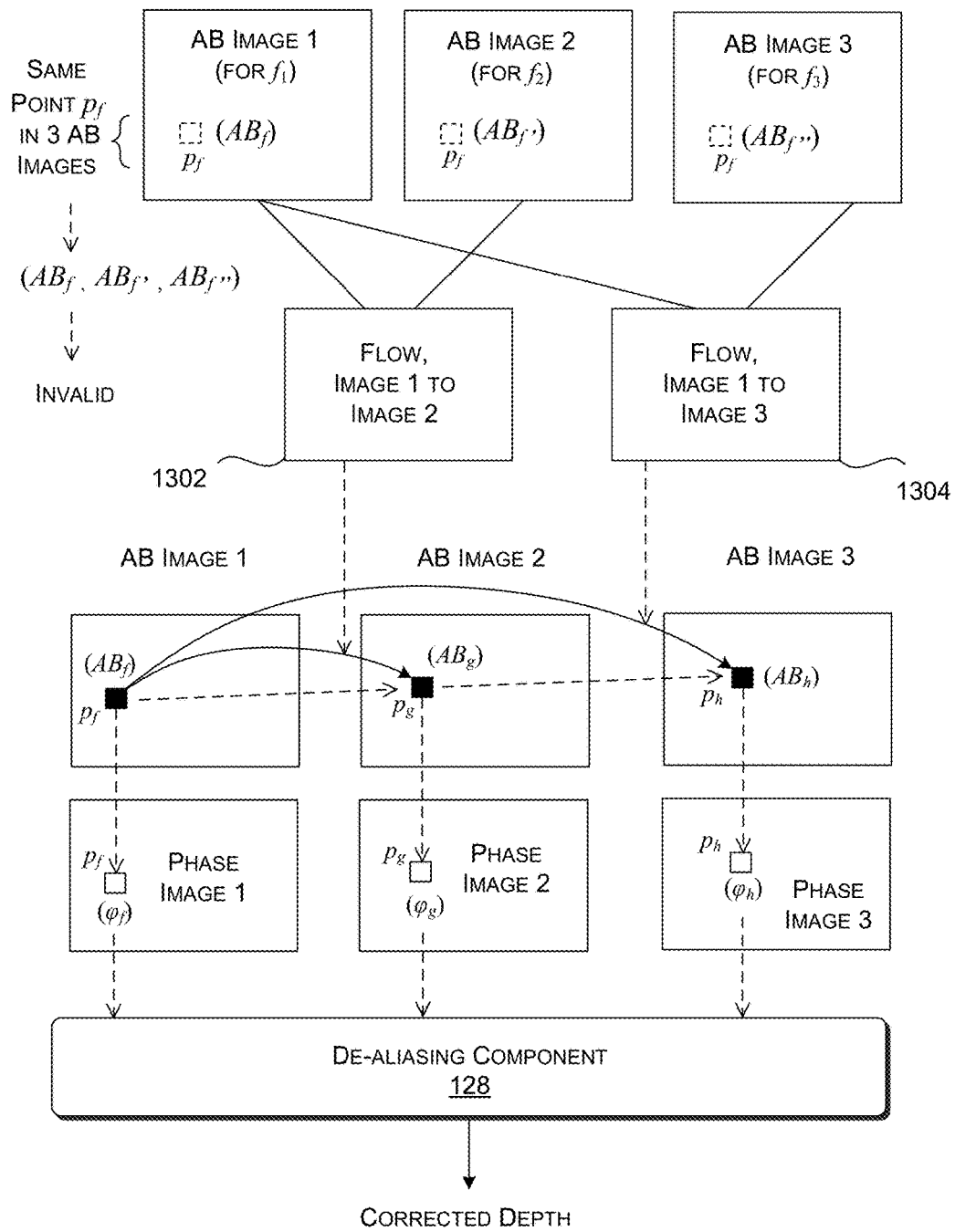
FIG. 13 demonstrates one manner of operation of a pixel-correcting component, which is another element of the depth-sensing device of FIG. 1.

FIG. 13 shows one technique that the pixel-correcting component 132 can use to repair an invalidated pixel based on optical flow information for the case of motion blur. As shown there, assume that the MCC 126 produces three active brightness images for three respective frequencies, e.g., an AB image 1 for a frequency $f_1$, an AB image 2 for a frequency $f_2$, and an AB image 3 for a frequency $f_3$. Each AB image provides AB measurements associated with the respective sensor elements (and associated pixels) of the sensor 108. The MCC 126 also produces counterpart phase images for the three frequencies. Each phase image provides phase measurements associated with the respective sensor elements.

Assume that an image point $p_f$ generally denotes the (x, y) coordinates of a pixel in the AB image 1. That image point has an active brightness measurement of $AB_f$ in AB image 1. The same image point $p_f$ (having the same x, y coordinates) has the value of $AB_{f'}$ in AB image 2, and the value of $AB_{f''}$ in AB image 3. Further assume that, due to motion blur, the Variance measure with respect to this set of active brightness measurements ($AB_f$, $AB_{f'}$, $AB_{f''}$) satisfies the invalidation condition, causing the pixel-invalidating component 130 to invalidate the pixel associated with the point $p_f$. This also means that a depth value associated with the three corresponding phase measurements is not reliable.

To repair the pixel for the image point $p_f$, the pixel-correcting component 132 can compute a first instance of optical flow information 1302 that describes the correspondences of scene points in the AB image 1 with the same scene points in AB image 2. The pixel-correcting component 132 can also compute a second instance of optical flow information 1304 that measures the correspondences of the scene points in the AB image 1 with the same scene points in AB image 3. Each instance of optical flow information includes an array of 2D vectors. Each 2D vector, in turn, can be leveraged to determine how a particular scene point, corresponding to a particular pixel, moves between the two AB images from which it was computed. For example, a 2D vector can be used to determine the Δx and Δy displacement of a scene point between the two AB images.

In the example of FIG. 13, assume that the pixel-correcting component 132 uses the first instance of optical flow information 1302 to determine that the scene point associated with the image point $p_f$ in the AB image 1 moves to an image point $p_g$ in the AB image 2. For instance, the image point $p_f$ may have coordinates (100, 100) in AB image 1, and the image point $P_g$ may have coordinates (102, 98) in AB image 2. Further assume that the pixel-correcting component 132 uses the second instance of optical flow information 1304 to determine that the scene point associated with the image point $p_f$ moves to an image point $p_h$ in the AB image 3. For instance, the image point $p_h$ may have coordinates (104, 96) in AB image 3.

The pixel-correcting component 132 then determines the phases associated with the thus-determined image points by consulting the corresponding phase images (phase image 1, phase image 2, and phase image 3). For instance, the pixel-correcting component 132 identifies a phase $\varphi_f$ associated with the coordinates of image point $p_f$, a phase $\varphi_g$ associated with the coordinates of image point $p_g$, and a phase $\varphi_h$ associated with the coordinates of image point $p_h$. Next, the pixel-correcting component 132 uses the de-aliasing component 128 to determine the depth value associated with these three phases, e.g., by mapping the three phases into a depth value using the lookup table 702. The pixel-correcting component 132 uses this value in place of the invalidated pixel associated with point $p_f$, thus repairing that invalidated pixel.

Consider a specific example of the operation of the pixel-correcting component 132. Assume that the object 1106 (of FIG. 11) quickly moves across the field of view of the head-mounted display 1102. At a particular time, the image point $p_f$ in AB image 1 may have a value associated with a scene point on the object 1106 itself, while the same image point $p_f$ in AB image 3 may have a value associated with a scene point in a background plane. This mistake may be most likely to occur with respect to the edge points associated with the object 1106. The pixel-correcting component 132 can correct this mistake in the manner described by leveraging optical flow information that conveys the manner in which scene points move across successive AB images. The pixel-correcting component 132 specifically relies on AB images to compute the optical flow information (rather than phase information) based on the assumption that the active brightness (associated with the appearance of the object being imaged) is generally not expected to significantly change from AB image to AB image.

The above-mentioned example uses measurements produced by the MCC 126 to reconstruct invalidated pixels. But in other cases, the pixel-correcting component 132 can perform its operations on a different level of analysis, such as by directly operating on raw sensor readings and/or depth values rather than, or in addition to, measurements produced by the MCC 126.

Further, the pixel-correcting component 132 can use other techniques to repair pixels, with or without the use of optical flow information. Such other techniques can include interpolation techniques (e.g., simple averaging, bilinear interpolation, spline interpolation, and bilateral filtering), video in-painting techniques, etc. For example, an interpolation technique can repair an invalidated pixel by computing an average of the depth value(s) of one or more neighboring pixels.

In another approach, the pixel-correcting component 132 can correct a pixel associated with an object by modeling the motion of the object. For instance, assume that the incorrect pixel occurs at time $t_x$, and that the depth-generating engine 110 has calculated the (presumed) correct depth of the object at an immediately preceding instance of time, $t_{x-1}$. Further assume that the pixel-correcting component 132 can estimate the motion (e.g., direction of travel and speed) of the object based on depth values captured over a span of time immediately preceding $t_x$, e.g., assuming the simplified case of linear motion. The pixel-correcting component 132 can estimate the correct depth of the pixel at time $t_x$ by projecting the object along its presumed path from time $t_{x-1}$, given its estimated direction of travel, speed, and the interval of time (Δt) between $t_{x-1}$ and $t_x$.

The pixel-correcting component 132 can perform a computationally efficient version of the above technique using MCC measurements associated with a single frequency. For instance, the pixel-correcting component 132 can estimate the rate ($rate_{est}$) at which the vector computed by the MCC 126 (for a single frequency and associated with a given scene point) is sweeping around the origin of the complex domain in the span of time immediately preceding time $t_x$. The pixel-correcting component 132 can then estimate the phase $\varphi_{est}$ of that vector at time $t_x$ based on $rate_{est}$ and Δt. Finally, the pixel-correcting component 132 can estimate the depth value given the estimated phase $\varphi_{est}$, together with the known wrap integer n at time $t_{x-1}$ for the given frequency, which is assumed to remain the same at time $t_x$.

Figure 14:
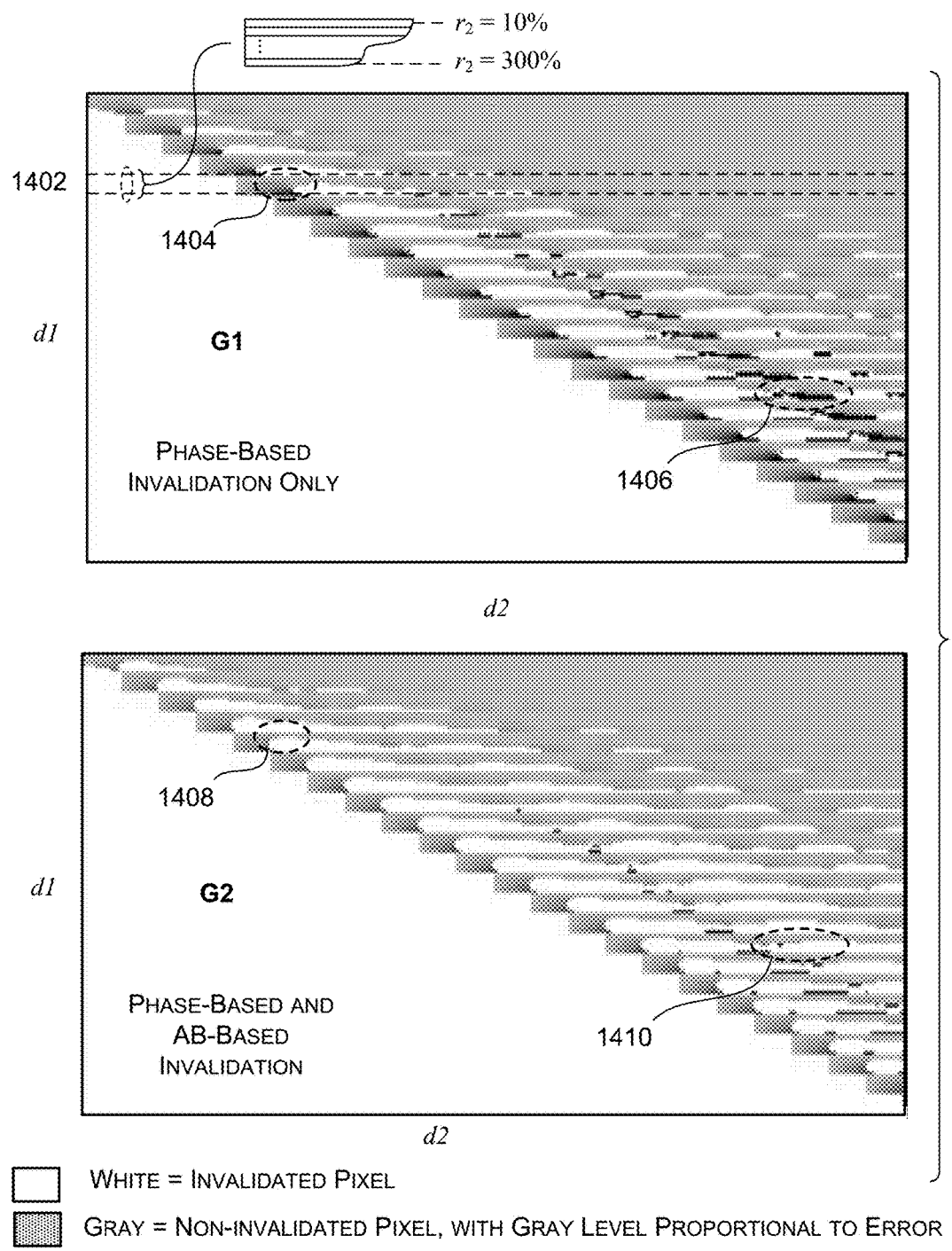
FIG. 14 shows the performance of the depth-sensing device (of FIG. 1) in removing inaccurate pixels caused by multipath interference, in comparison to a phase-based-only invalidation strategy.

FIG. 14 shows the performance of the depth-sensing device 102 in removing inaccurate pixels caused by multi-path interference, in comparison to a phase-based-only invalidation strategy. More specifically, the graph G1 shows the performance of the depth-sensing device 102 in removing invalid pixels using just the phase-based strategy performed by the de-aliasing component 128. (Recall that the phase-based-only strategy involves invalidating a pixel when the lookup table 702 indicates that the combination of its associated phases do not map to any viable depth.) The graph G2 shows the performance of the depth-sensing device 102 using the active brightness-based strategy associated with FIG. 8, in combination with the phase-based strategy.

In both graphs (G1, G2), the goal is to measure the depth of an object under consideration at distance $d_1$, having reflectivity $r_1$. The depth measurement is corrupted by the contribution of another path having a distance $d_2$ and a reflectivity $r_2$. (The same analysis can be extended to multipath interference associated with two or more paths.) The vertical axis of each graph corresponds to different values of $d_1$, e.g., corresponding to 500, 750, 1000, 1250, 1500, 1750, 2000, 2250, 2500, 2750, 3000, 3250, 3500, 3750, 4000, 4250, 4500, 4750, 5000, 5250, 5500, 5750, 6000 mm. The reflectivity $r_1$ of the point at distance $d_1$ if fixed at 50%. The horizontal axis of each graph corresponds to different values of $d_2$, e.g., ranging from 500 mm to 6000 mm in 10 mm steps. Further, each graph devotes a block (such as representative block 1402) to each value of $d_1$. Each block, in turn, is composed of plural horizontal lines associated with different $r_2$ values, e.g., 10%, 25%, 50%, 75%, 100%, 150%, 200%, 300%.

In both graphs (G1, G2), a white color element represents a pixel that has been successfully invalidated. A grayscale-colored element reflects a pixel that has not been invalidated, but which nevertheless has some depth-related error associated therewith. The element's grayscale level reflects the magnitude of its error, such that darkness increases with increasing error of the element.

With respect to the graph G1, note that, by just using the phase-based invalidation strategy, the depth image includes some pixels that have relatively large errors that have not been invalidated. For instance, regions 1404 and 1406 include large errors. But in graph G2, by also using the active brightness invalidation strategy, many of the pixels associated with the large errors are now invalidated. This can be seen in the regions 1408 and 1410, which are the counterparts to the regions 1404 and 1406.

Figure 15:
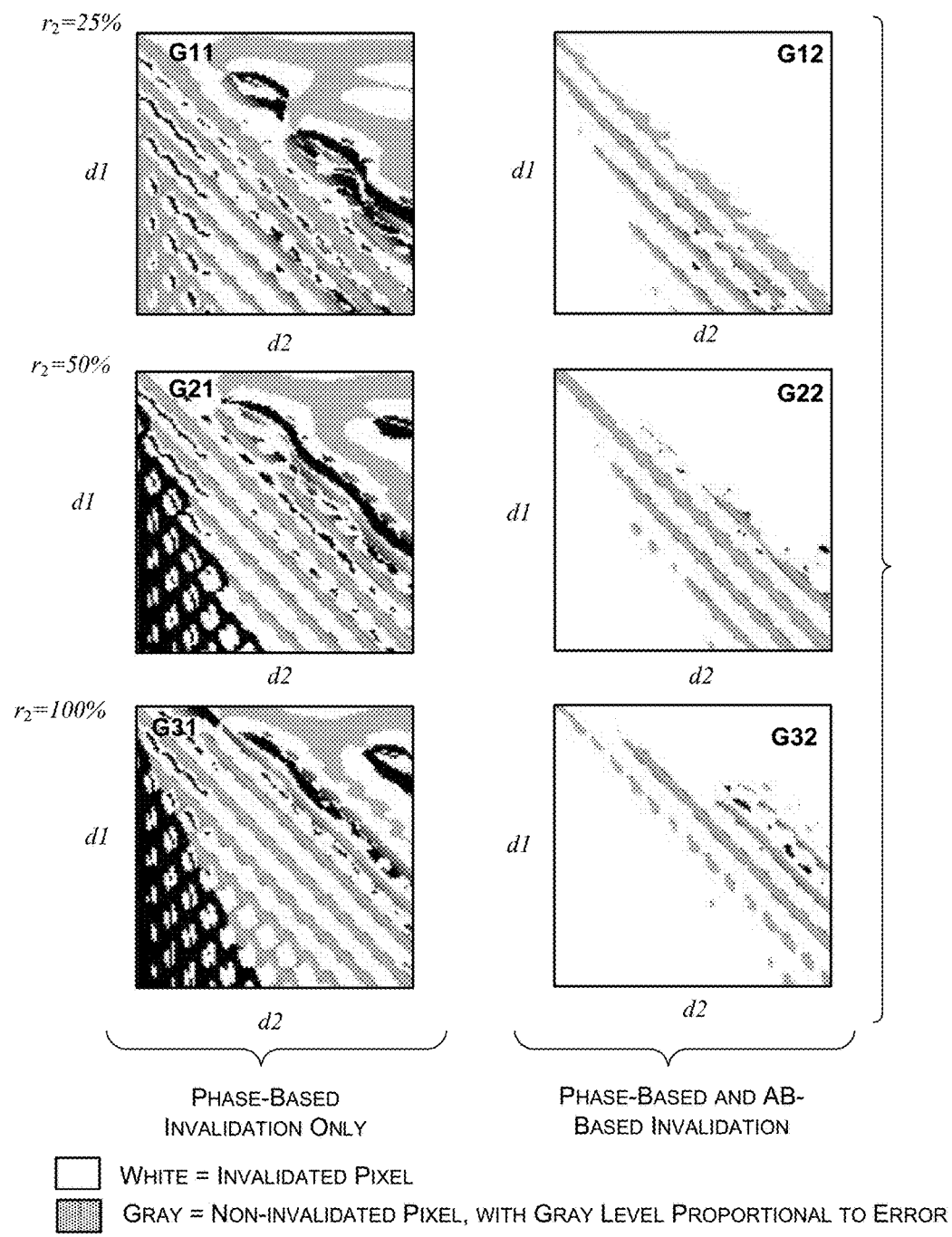
FIG. 15 shows the performance of the depth-sensing device (of FIG. 1) in removing inaccurate pixels caused by motion blur, in comparison to the phase-based-only invalidation strategy.

FIG. 15 shows the simulated performance of the depth-sensing device 102 in removing inaccurate pixels caused by motion blur, in comparison to the phase-based invalidation strategy. In this case, Equation (8) is used to produce a plurality of simulated sensor readings M[i] for the case in which the imaged scene includes a first point at distance $d_1$ having reflectivity $r_1$ and a second point at a distance $d_2$ having a reflectivity $r_2$. The depth-sensing device 102 computes a distance $d_m$ based on the sensor readings M[i]. The simulation estimates the error as $d_m-d_1$ when $abs(d_m-d_1)$ <$abs(d_m-d_2)$, and $d_m-d_2$ otherwise (where "abs" refers to "absolute value"). This simulation is predicated on the assumption that both of the points at distances $d_1$ and $d_2$ represent correct answers, and that a point is erroneous to the extent to which its depth diverges from either of these two accepted depths ($d_1$, $d_2$).

Each of the graphs (G11, G12, G21, G22, G31, G32) plots the distance $d_1$ along its vertical axis and the distance $d_2$ along its horizontal axis. The reflectivity $r_1$ of the first point is set to 50%. In graphs G11 and G12, the reflectivity $r_2$ is set at 25%. In graphs G21 and G22, the reflectivity $r_2$ is set to 50%. And in graphs G31 and G32, the reflectivity $r_2$ is set to 100%.

The gray-colored elements in each graph represent pixels that have not been invalided, but which nevertheless have errors defined by the above-described error function. The white elements in each graph represent pixels that have been successfully invalidated. Further, the graphs G11, G21, and G31 correspond to the case in which only the phase-based strategy is used to invalidate pixels, while the graphs G12, G22, and G32 correspond to the case in which the active brightness strategy shown in FIG. 8 is used to invalidate the points in conjunction with the phase-based strategy. Note that the phase-based-only strategy leads to pixels that have large errors that are nevertheless not invalidated. The active brightness-based approach successfully removes many of these pixels that have large errors associated therewith.

In general conclusion, FIGS. 14 and 15 demonstrate that the active brightness-based strategy can improve the quality of a depth image by removing pixels associated with faulty depth values. Many of these pixels cannot be successfully removed using the phase-based-only strategy.

Figure 16:
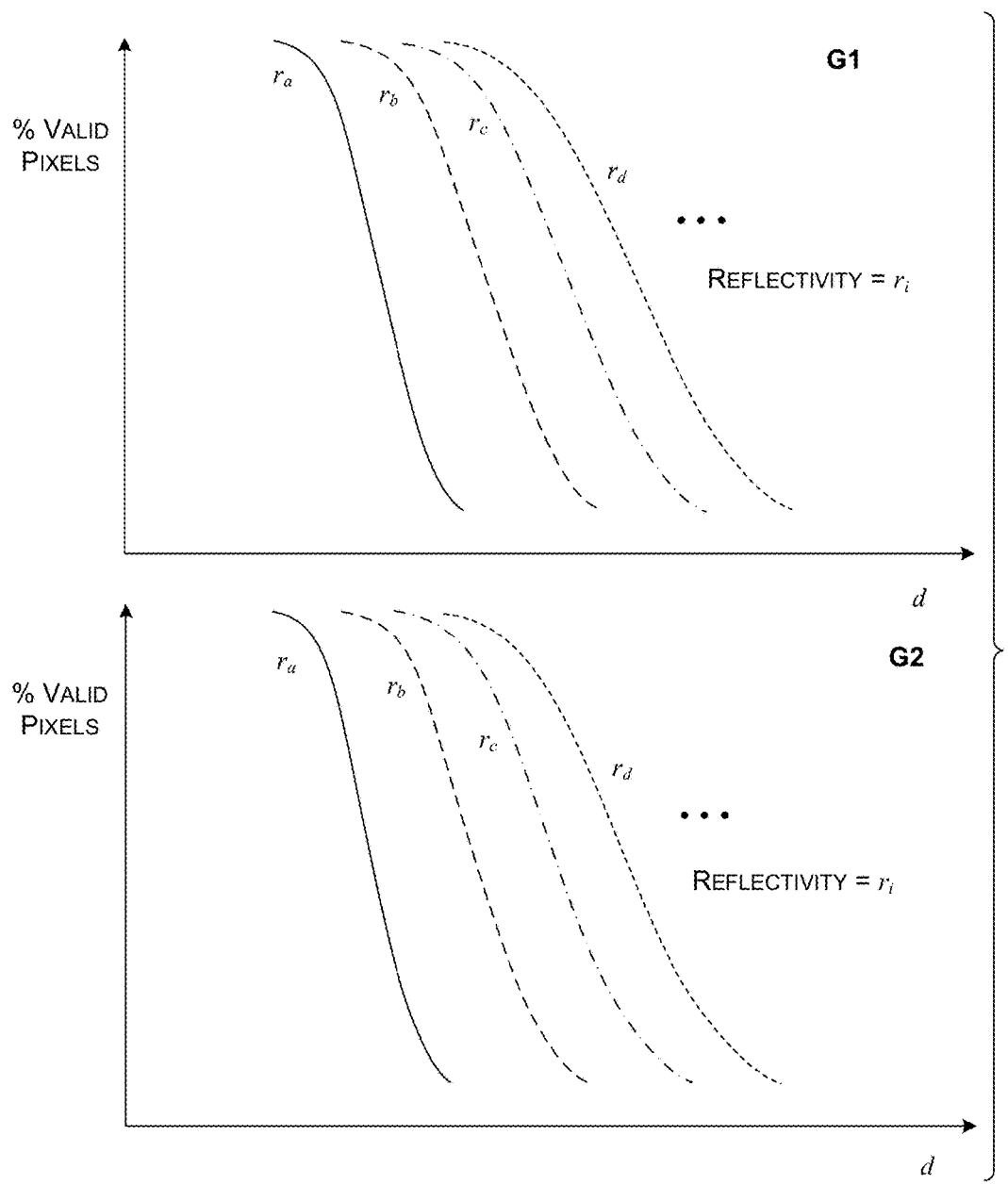
FIG. 16 shows the performance of the depth-sensing device (of FIG. 1) with respect to the generation of false positives.

Finally, FIG. 16 shows the case in which points are imaged in an environment that does not suffer from either multipath interference or motion blur, but may otherwise be subject to photon noise. Each graph plots the number of invalidated pixels verses depth d of the points under consideration. The graph G1 reflects the performance of the depth-sensing device 102 when the phase-strategy-only is used (for plural different reflectivity values $r_1$ associated with the points), while the graph G2 reflects the performance of the depth-sensing device 102 when the active brightness strategy is used in conjunction with the phase-based strategy. Note that the curves in the graph G1 closely match the curves in the graph G2. Based thereon, it may be concluded that the active brightness strategy does not markedly produce false positives. A false positive occurs when the depth-generating engine 110 indicates that a pixel should be invalidated because it represents an inaccurate depth when, in fact, the depth is accurate.

B. Illustrative Processes

Figure 17:
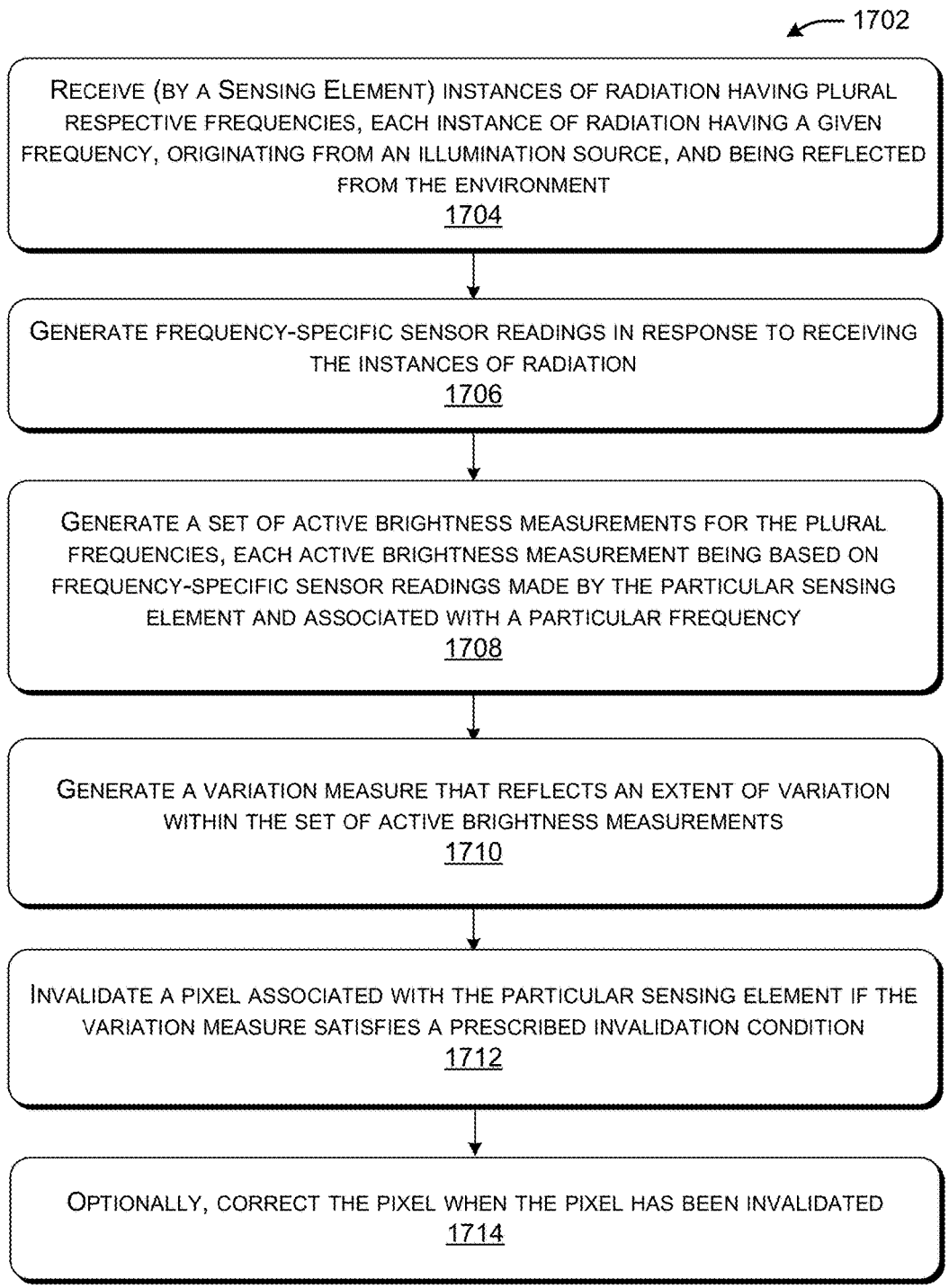
FIG. 17 is a process that provides an overview of one manner of operation of the depth-sensing device of FIG. 1.
Figure 18:
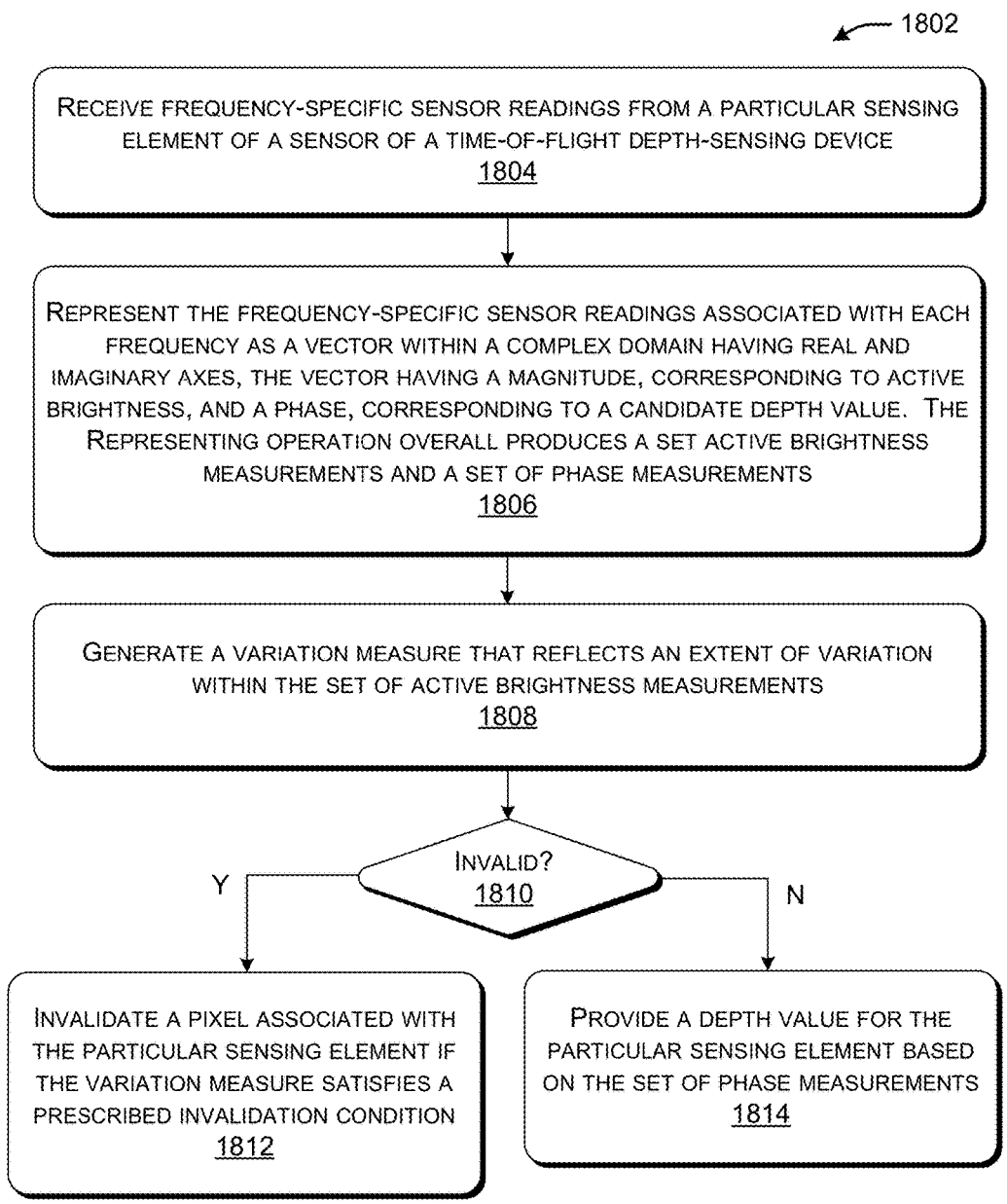
FIG. 18 shows one particular manner of implementing the process of FIG. 17.

FIGS. 17 and 18 show processes that explain the operation of the depth-sensing device 102 of Section A in flowchart form. Since the principles underlying the operation of the depth-sensing device 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

Starting with FIG. 17, this figure shows a process 1702 that provides an overview of one manner of operation of the depth-sensing device 102 of FIG. 1. The process 1702 particularly describes processing that may be performed with respect to sensor readings collected by a particular sensing element (e.g., sensing element 120) of the sensor 108. In block 1704, a sensing element receives instances of radiation having plural respective frequencies. That is, each instance of radiation has a given frequency, originates from the illumination source 106, and is reflected from the environment 104. In block 1706, the sensing element generates frequency-specific sensor readings in response to receiving the instances of radiation. In block 1708, the depth-generating engine 110 generates a set of active brightness measurements for the plural frequencies. Each active brightness measurement is based on frequency-specific sensor readings made by the particular sensing element that are associated with a particular frequency. In block 1710, the depth-generating engine 110 generates a variation measure (Variance) that reflects an extent of variation within the set of active brightness measurements. In block 1712, the depth-generating engine 110 invalidates a pixel associated with the particular sensing element if the variation measure satisfies a prescribed invalidation condition. In block 1714, the depth-generating engine 110 can optionally correct the pixel when the pixel has been invalidated. The correction can be performed using optical flow information, with respect to different levels of analysis in the manner described above.

FIG. 18 is a process 1802 that represents one particular implementation of the process 1702 of FIG. 17. In block 1804, the depth-generating engine 110 receives frequency-specific sensor readings from a particular sensing element of the sensor 108 in the manner described above. In block 1806, the depth-generating engine 110 represents the frequency-specific sensor readings associated with each frequency as a vector within a complex domain having real and imaginary axes. The vector has a magnitude that corresponds to active brightness, and a phase that corresponds to a candidate depth value. Overall, block 1806 produces: a set active brightness measurements for the plural frequencies for the particular sensing element; and a set of phase measurements for the plural frequencies for the particular sensing element. In block 1808, the depth-generating engine 110 generates a variation measure that reflects an extent of variation within the set of active brightness measurements. In block 1810, the depth-generating engine 110 tests whether the variation measure satisfies a prescribed invalidation condition. In block 1812, when the variation measure satisfies the prescribed invalidation condition, the depth-generating engine 110 invalidates a pixel associated with the particular sensing element. In block 1814, when the variation measure does not satisfy the prescribed invalidation condition, the depth-generating engine 110 provides a depth value for the particular sensing element based on the set of phase measurements.

C. Representative Computing Functionality

Figure 19:
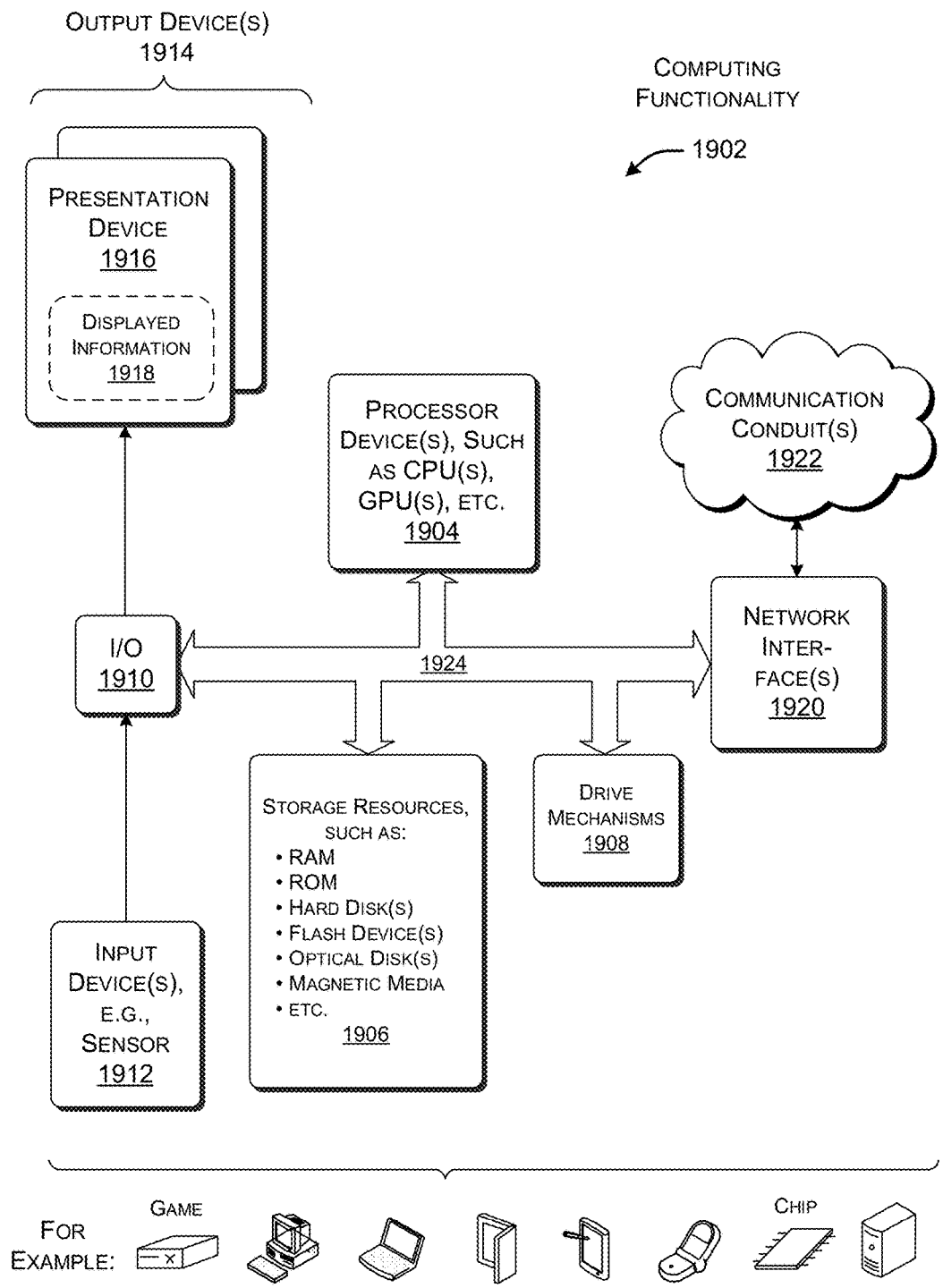
FIG. 19 shows illustrative computing functionality that can be used to implement a depth-generating engine, which is another element of the depth-sensing device of FIG. 1.

FIG. 19 shows computing functionality 1902 that can be used to implement one or more parts of the depth-generating engine 110 of FIG. 1. In all cases, the computing functionality 1902 represents one or more physical and tangible processing mechanisms.

The computing functionality 1902 can include one or more hardware processor devices 1904, such as one or more central processing units (CPUs), and/or one or more graphical processing units (GPUs), and so on. The computing functionality 1902 can also include any storage resources (also referred to as computer-readable storage media or computer-readable storage medium devices) 1906 for storing any kind of information, such as machine-readable instructions, settings, data, etc. Without limitation, for instance, the storage resources 1906 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1902. The computing functionality 1902 may perform any of the functions described above (e.g., as summarized in the processes (1702, 1802) of Section B) when the hardware processor device(s) 1904 carry out computer-readable instructions stored in any storage resource or combination of storage resources. The computing functionality 1902 also includes one or more drive mechanisms 1908 for interacting with any storage resource, such as a hard disk drive mechanism, an optical disk drive mechanism, and so on.

The computing functionality 1902 also includes an input/output component 1910 for receiving various inputs (via input devices 1912), and for providing various outputs (via output devices 1914). Illustrative input devices include at least the above-described sensor 108. One particular output mechanism may include a display device 1916 that displays information 1918 based on the processing operations performed by the processor devices 1914. The computing functionality 1902 can also include one or more network interfaces 1920 for exchanging data with other devices via one or more communication conduits 1922. One or more communication buses 1924 communicatively couple the above-described components together.

The communication conduit(s) 1922 can be implemented in any manner, e.g., by a local area computer network, a wide area computer network (e.g., the Internet), point-to-point connections, etc., or any combination thereof. The communication conduit(s) 1922 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1902 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself In one use case, the computing functionality 1902 is part of a head-mounted display device. In that context, the computing functionality 1902 can also include equipment for determining the position and orientation of the head-mounted display, such as an inertial measurement unit (IMU) in conjunction with Simultaneous Localization and Mapping (SLAM) functionality. The display device 1916 can present the information 1918 it computes in various ways, such by projecting computer-rendered objects onto a representation of a physical scene, e.g., using a partially silvered mirror. Illustrative head-mounted input/output equipment that can be used in this use scenario is described in, for instance, U.S. application Ser. No. 14/600,856 to Paulovich, et al., filed on Jan. 20, 2015.

The following summary provides a non-exhaustive list of illustrative aspects of the technology set forth herein.

According to a first aspect, a method for sensing an environment using a time-of-flight depth-sensing device is described. The method includes, for each particular sensing element of a sensor of the time-of-flight depth-sensing device, the operations of: receiving instances of radiation having plural respective frequencies, each instance of radiation having a given frequency, originating from an illumination source, and being reflected from the environment; generating frequency-specific sensor readings in response to receiving the instances of radiation; generating a set of active brightness measurements for the plural frequencies, each active brightness measurement being based on frequency-specific sensor readings made by the particular sensing element that are associated with a particular frequency; generating a variation measure that reflects an extent of variation within the set of active brightness measurements; and invalidating a pixel associated with the particular sensing element if the variation measure satisfies a prescribed invalidation condition.

According to a second aspect, the method generates each active brightness measurement for a particular frequency by: representing the frequency-specific sensor readings associated with the particular frequency as a vector within a complex domain having real and imaginary axes; and generating the active brightness measurement for the particular frequency by computing a magnitude of the vector.

According to a third aspect, the method generates the variation measure by: identifying a minimum active brightness measurement in the set of active brightness measurements; identifying a maximum active brightness measurement in the set of active brightness measurements; and generating the variation measure as a normalized difference between the minimum active brightness measurement and the maximum active brightness measurement.

According to a fourth aspect, the method invalidates the pixel when the normalized difference fails to satisfy a prescribed threshold.

According to a fifth aspect, for each particular sensing element, the method further includes: generating a set of phase measurements for the plural frequencies, each phase measurement being based on the frequency-specific sensor readings made by the particular sensing element that are associated with a particular frequency; and determining whether the set of phase measurements corresponds to an anomalous depth measurement, to provide a phase-based anomaly assessment. The above-referenced invalidating is based on the variance measure in conjunction with the anomaly assessment.

According to a sixth aspect, the above-referenced determining whether the set of phase measurements corresponds to an anomalous condition includes mapping the set of phase measurements into the phase-based anomaly assessment using a lookup table.

According to a seventh aspect, the method further includes, when the frequency-specific sensor readings from the particular sensing element have not been invalidated: generating, via a de-aliasing operation, a depth value based on the set of phase measurements, the depth value reflecting a distance between a reference point and a point in the environment that has been imaged by the particular sensing element.

According to an eighth aspect, in one case, the pixel associated with the particular sensing element is invalidated due to motion blur that affects the particular pixel.

According to a ninth aspect, alternatively or in addition to the eighth aspect, the pixel associated with the particular sensing element is invalidated due to multipath interference that affects the particular pixel.

According to a tenth aspect, the method further includes correcting the pixel when the pixel has been invalidated, by generating a correct depth value for the pixel.

According to an eleventh aspect, the above-referenced correcting includes: computing optical flow information based on a plurality of successive active brightness images, each active brightness image containing a collection of active brightness measurements associated with a particular frequency; using the optical flow information to identify movement of a scene point, associated with the pixel that has been invalidated, across the successive active brightness images; generating a set of phase measurements based on positions of the scene point across the successive active brightness images; and generating, via a de-aliasing operation, the correct depth value based on the set of phase measurements.

According to a twelfth aspect, a time-of-flight depth-sensing device is described that includes a sensor having a plurality of sensing elements, each particular sensing element operating to: receive instances of radiation having plural respective frequencies, each instance of radiation having a given frequency, originating from an illumination source, and being reflected from an environment; and generate frequency-specific sensor readings in response to receiving the instances of radiation. The depth-sensing device further includes a depth-generating engine configured to: generate a set of active brightness measurements for the plural frequencies, each active brightness measurement being based on frequency-specific sensor readings made by the particular sensing element that are associated with a particular frequency; generate a variation measure that reflects an extent of variation within the set of active brightness measurements; and invalidate a pixel associated with the particular sensing element if the variation measure satisfies a prescribed invalidation condition.

According to a thirteenth aspect, a computer-readable storage medium for storing computer-readable instructions is described. The computer-readable instructions, when executed by one or more processor devices, perform a method that includes: receiving frequency-specific sensor readings from a particular sensing element of a sensor of a time-of-flight depth-sensing device. The frequency-specific sensor readings are received, in turn, in response to receiving instances of radiation having plural respective frequencies by the particular sensor element, each instance of radiation having a given frequency, originating from an illumination source, and being reflected from an environment. The method further includes representing the frequency-specific sensor readings associated with each frequency as a vector within a complex domain having real and imaginary axes, the vector having a magnitude, corresponding to active brightness, and a phase, corresponding to a candidate depth value. Overall, the representation operation produces: a set active brightness measurements for the plural frequencies for the particular sensing element; and a set of phase measurements for the plural frequencies for the particular sensing element. The method further includes: generating a variation measure that reflects an extent of variation within the set of active brightness measurements; when the variation measure satisfies a prescribed invalidation condition, invalidating a pixel associated with the particular sensing element; and when the variation measure does not satisfy the prescribed invalidation condition, providing a depth value for the particular sensing element based on the set of phase measurements.

A fourteenth aspect corresponds to any combination (e.g., any permutation or subset) of the above-referenced first through thirteenth aspects.

A fifteenth aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through fourteenth aspects.

In closing, the description may have set forth various concepts in the context of illustrative challenges or problems. This manner of explanation is not intended to suggest that the subject matter recited in the claims is limited to solving the identified challenges or problems; that is, the subject matter in the claims may be applied in the context of other challenges or problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for sensing an environment using a time-of-flight depth-sensing device, comprising, for a particular sensing element of a sensor of the time-of-flight depth-sensing device:

receiving instances of radiation having plural respective frequencies, each instance of radiation having a given frequency, originating from an illumination source, and being reflected from the environment;

generating frequency-specific sensor readings in response to receiving the instances of radiation;

generating a set of active brightness measurements for the plural frequencies, each active brightness measurement being based on frequency-specific sensor readings made by the particular sensing element that are associated with a particular frequency;

generating a variation measure that reflects an extent of variation within the set of active brightness measurements; and invalidating a pixel associated with the particular sensing element if the variation measure satisfies a prescribed invalidation condition.

2. The method of claim 1, where the method generates each active brightness measurement for a particular frequency by:

representing the frequency-specific sensor readings associated with the particular frequency as a vector within a complex domain having real and imaginary axes; and generating the active brightness measurement for the particular frequency by computing a magnitude of the vector.

3. The method of claim 1, wherein the method generates the variation measure by:

identifying a minimum active brightness measurement in the set of active brightness measurements;

identifying a maximum active brightness measurement in the set of active brightness measurements; and generating the variation measure as a normalized difference between the minimum active brightness measurement and the maximum active brightness measurement.

4. The method of claim 3, wherein the method invalidates the pixel when the normalized difference fails to satisfy a prescribed threshold.

5. The method of claim 1, further comprising, for the particular sensing element:

generating a set of phase measurements for the plural frequencies, each phase measurement being based on the frequency-specific sensor readings made by the particular sensing element that are associated with a particular frequency; and determining whether the set of phase measurements corresponds to an anomalous depth measurement, to provide a phase-based anomaly assessment, wherein said invalidating is based on the variance measure in conjunction with the anomaly assessment.

6. The method of claim 5, wherein said determining whether the set of phase measurements corresponds to an anomalous condition comprises mapping the set of phase measurements into the phase-based anomaly assessment using a lookup table.

7. The method of claim 5, wherein, when the frequency-specific sensor readings from the particular sensing element have not been invalidated:

generating, via a de-aliasing operation, a depth value based on the set of phase measurements, the depth value reflecting a distance between a reference point and a point in the environment that has been imaged by the particular sensing element.

8. The method of claim 1, wherein the pixel associated with the particular sensing element is invalidated due to motion blur that affects the particular pixel.

9. The method of claim 1, wherein the pixel associated with the particular sensing element is invalidated due to multipath interference that affects the particular pixel.

10. The method of claim 1, further comprising correcting the pixel when the pixel has been invalidated, by generating a correct depth value for the pixel.

11. The method of claim 10, wherein said correcting comprises:

computing optical flow information based on a plurality of successive active brightness images, each active brightness image containing a collection of active brightness measurements associated with a particular frequency;

using the optical flow information to identify movement of a scene point, associated with the pixel that has been invalidated, across the successive active brightness images;

generating a set of phase measurements based on positions of the scene point across the successive active brightness images; and generating, via a de-aliasing operation, the correct depth value based on the set of phase measurements.

12. A time-of-flight depth-sensing device, comprising:

a sensor having a plurality of sensing elements, a particular sensing element operating to:

receive instances of radiation having plural respective frequencies, each instance of radiation having a given frequency, originating from an illumination source, and being reflected from an environment; and generate frequency-specific sensor readings in response to receiving the instances of radiation; and a depth-generating engine configured to:

generate a set of active brightness measurements for the plural frequencies, each active brightness measurement being based on frequency-specific sensor readings made by the particular sensing element that are associated with a particular frequency;

generate a variation measure that reflects an extent of variation within the set of active brightness measurements; and invalidate a pixel associated with the particular sensing element if the variation measure satisfies a prescribed invalidation condition.

13. The time-of-flight depth-sensing device of claim 12, where the depth-generating engine is configured to generate each active brightness measurement for a particular frequency by:

representing the frequency-specific sensor readings associated with the particular frequency as a vector within a complex domain having real and imaginary axes; and generating the active brightness measurement for the particular frequency by computing a magnitude of the vector.

14. The time-of-flight depth-sensing device of claim 12, wherein the depth-generating engine is configured to generate the variation measure by:

identifying a minimum active brightness measurement in the set of active brightness measurements;

identifying a maximum active brightness measurement in the set of active brightness measurements; and generating the variation measure as a normalized difference between the minimum active brightness measurement and the maximum active brightness measurement.

15. The time-of-flight depth-sensing device of claim 14, wherein the depth-generating engine is configured to invalidate the pixel when the normalized difference fails to satisfy a prescribed threshold.

16. The time-of-flight depth-sensing device of claim 12, wherein the depth-generating engine is further configured to, for the particular sensing element:

generate a set of phase measurements for the plural frequencies, each phase measurement being based on the frequency-specific sensor readings made by the particular sensing element that are associated with a particular frequency; and determine whether the set of phase measurements corresponds to an anomalous depth measurement, to provide a phase-based anomaly assessment, wherein the depth-generating engine is configured to invalidate the pixel based on the variance measure in conjunction with the anomaly assessment.

17. The time-of-flight depth-sensing device of claim 16, wherein the depth-generating engine includes a de-aliasing component that is configured to, when the frequency-specific sensor readings from the particular sensing element have not been invalidated:

generate a depth value based on the set of phase measurements, the depth value reflecting a distance between a reference point and a point in the environment that has been imaged by the particular sensing element.

18. The time-of-flight depth-sensing device of claim 12, further including a pixel-correcting component configured to correct the pixel when the pixel has been invalidated, by generating a correct depth value for the pixel.

19. A computer-readable storage medium for storing computer-readable instructions, the computer-readable instructions, when executed by one or more processor devices, performing a method that comprises:

receiving frequency-specific sensor readings from a particular sensing element of a sensor of a time-of-flight depth-sensing device, the frequency-specific sensor readings being received, in turn, in response to receiving instances of radiation having plural respective frequencies by the particular sensor element, each instance of radiation having a given frequency, originating from an illumination source, and being reflected from an environment;

representing the frequency-specific sensor readings associated with each frequency as a vector within a complex domain having real and imaginary axes, the vector having a magnitude, corresponding to active brightness, and a phase, corresponding to a candidate depth value, overall, said representing producing:

a set active brightness measurements for the plural frequencies for the particular sensing element; and a set of phase measurements for the plural frequencies for the particular sensing element;

generating a variation measure that reflects an extent of variation within the set of active brightness measurements;

when the variation measure satisfies a prescribed invalidation condition, invalidating a pixel associated with the particular sensing element; and when the variation measure does not satisfy the prescribed invalidation condition, providing a depth value for the particular sensing element based on the set of phase measurements.

20. The computer-readable storage medium of claim 19, wherein the method further includes correcting the pixel when the pixel has been invalidated, by generating a correct depth value for the pixel.

* * * * *